(12) United States Patent
Ferreira

(10) Patent No.: US 11,531,321 B2
(45) Date of Patent: Dec. 20, 2022

(54) MULTIDIMENSIONAL QUANTIZATION AND DISTRIBUTED AUTOMATIC SYSTEMS MANAGEMENT

(71) Applicant: Embraer S.A., São José dos Campos-SP (BR)

(72) Inventor: Julio Cesar Bolzani de Campos Ferreira, São José dos Campos (BR)

(73) Assignee: Embraer S.A., São José dos Campos-SP (BR)

( * ) Notice: Subject to any disclaimer, the term of this patent is extended or adjusted under 35 U.S.C. 154(b) by 222 days.

(21) Appl. No.: 16/693,785

(22) Filed: Nov. 25, 2019

(65) Prior Publication Data

US 2020/0166895 A1 May 28, 2020

(51) Int. Cl.
*G06F 16/27* (2019.01)
*G06N 5/02* (2006.01)
*G05B 19/408* (2006.01)
*G05B 11/01* (2006.01)
*G06N 10/00* (2022.01)
*G06F 16/28* (2019.01)

(52) U.S. Cl.
CPC .......... *G05B 19/408* (2013.01); *G05B 11/012* (2013.01); *G06F 16/27* (2019.01); *G06F 16/28* (2019.01); *G06N 5/02* (2013.01); *G06N 10/00* (2019.01)

(58) Field of Classification Search
CPC ..... G05B 19/408; G05B 11/012; G06F 16/27; G06F 16/28; G06F 16/283; G06F 16/289; G06N 5/02

USPC .......................................................... 700/20
See application file for complete search history.

(56) References Cited

U.S. PATENT DOCUMENTS

| | | | |
|---|---|---|---|
| 8,260,826 B2* | 9/2012 | Chen ................. | G06F 16/24568 707/803 |
| 9,213,574 B2 | 12/2015 | Faruquie et al. | |
| 9,251,237 B2* | 2/2016 | Adams ................. | G06F 16/353 |
| 2002/0026572 A1* | 2/2002 | Joory ................. | G06F 16/27 713/100 |
| 2003/0220890 A1* | 11/2003 | Okude ................. | G06N 5/04 706/50 |
| 2013/0238676 A1* | 9/2013 | Zha ................. | G06F 16/25 707/827 |
| 2015/0222438 A1* | 8/2015 | Hsien ................. | H04L 9/3247 713/189 |
| 2016/0321316 A1 | 11/2016 | Pennefather et al. | |

(Continued)

OTHER PUBLICATIONS

Degtyarev, et al. Solution of sectorization problems for an air traffic control area. I. Basic principles and questions of airspace sectorization and its formalization as an optimization problem. 2009 Journal of Computer and Systems Sciences International. (Year : 2009).*

(Continued)

*Primary Examiner* — Jason D Mitchell
(74) *Attorney, Agent, or Firm* — Nixon & Vanderhye P.C.

(57) ABSTRACT

Automatic system management is provided by controlling/managing part or all of the system operation through the predefined properties embedded in the components of the management system itself. The creation of Quanta with properties allow the programming of the rules for the system management in a way that any user, client, provider or any other type of participant can interact with the system without the need of an intermediary or approver.

14 Claims, 20 Drawing Sheets

(56) References Cited

U.S. PATENT DOCUMENTS

| | | | | |
|---|---|---|---|---|
| 2019/0340269 A1* | 11/2019 | Biernat | ................... | G06F 16/27 |
| 2020/0226123 A1* | 7/2020 | Nixon | ................... | H04L 9/0643 |
| 2020/0228316 A1* | 7/2020 | Cahill | ................... | H04L 9/0637 |
| 2020/0394708 A1* | 12/2020 | Celia | ................... | G06Q 40/025 |
| 2021/0166311 A1* | 6/2021 | Celia | ................... | G06N 3/0427 |
| 2021/0278823 A1* | 9/2021 | Sauer | ...................... | G06F 16/27 |
| 2021/0326223 A1* | 10/2021 | Grunwald | ............. | G06F 3/0632 |

OTHER PUBLICATIONS

Degtyarev et al. Solution of sectorization problems for an air traffic management area. II. Development of sectorization algorithms, 2010. Journal of Computerand Systems Sciences International. (Year: 2010).*

An et al. A smart airspace sectorization approach based on spectral clustering and NSGA-II, 2015, IEEE First Internatinoal Smart Cities Conference (Year: 2015).*

International Search Report issued in PCT/IB2019/060124 dated Jan. 29, 2020 (3 pages).

International Preliminary Report on Patentability with Written Opinion issued in PCT/IB2019/060124 dated May 25, 2021 (5 pages).

* cited by examiner

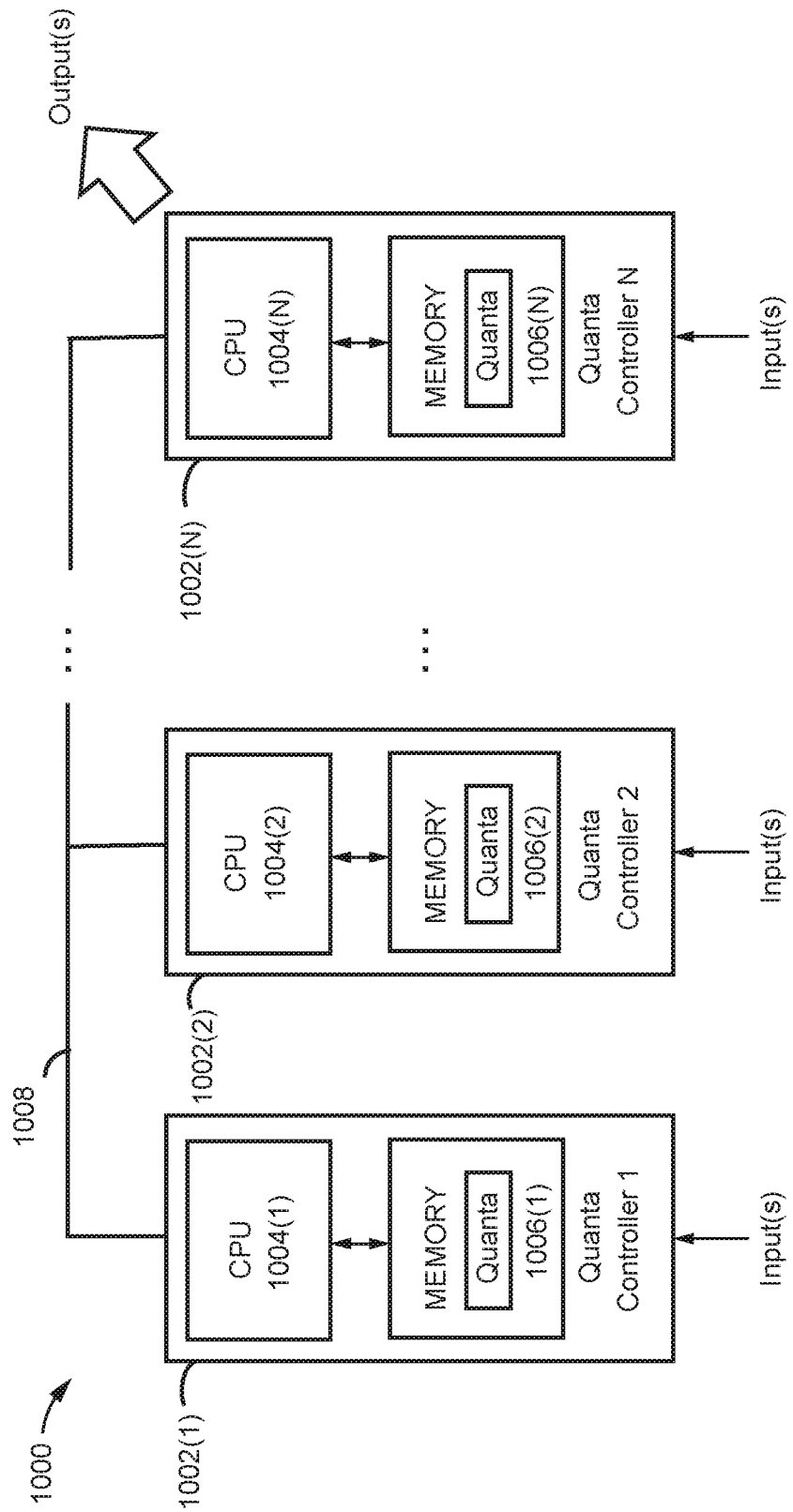

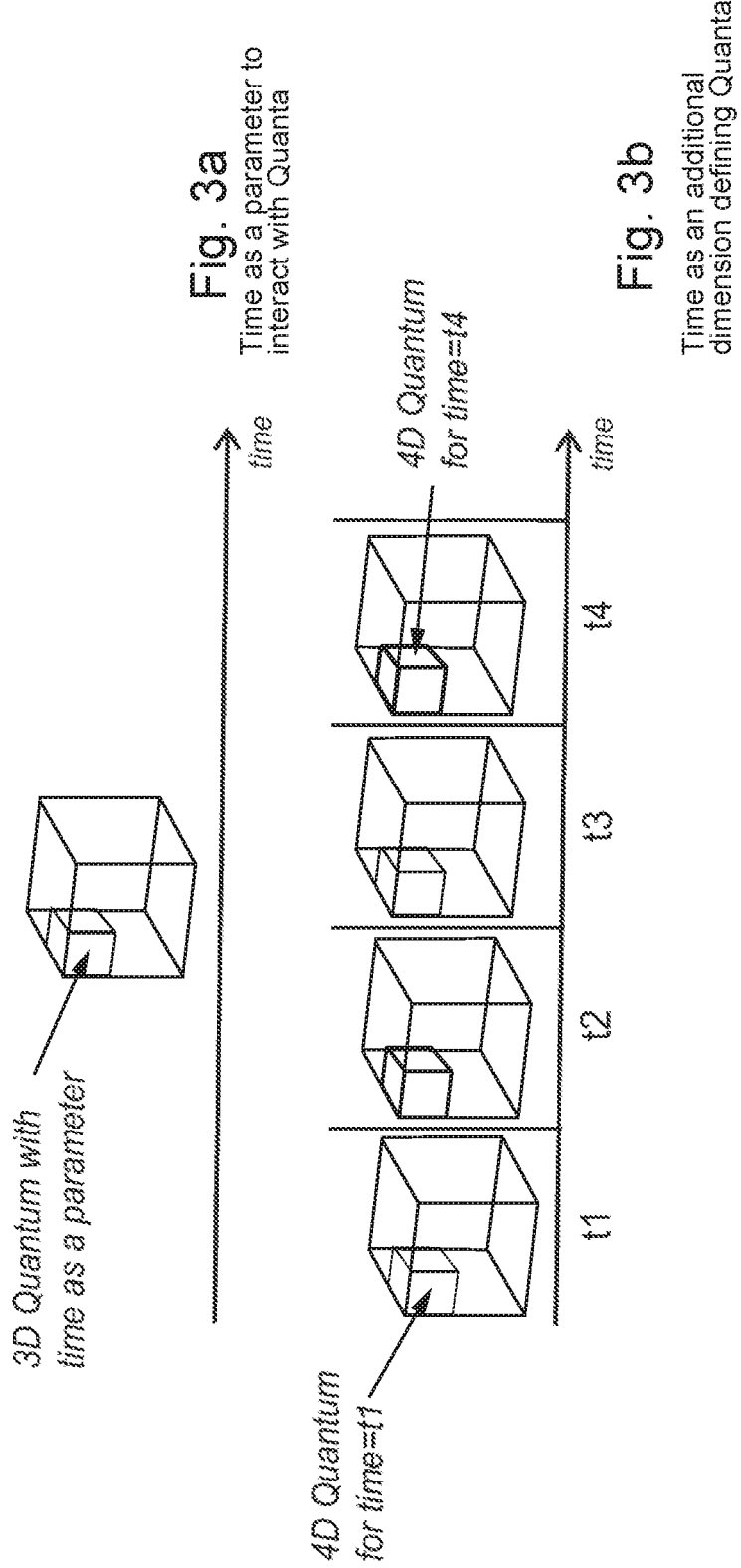

Example of Automatic Management in a simple system

Example of embedded Governance in a simple system

Participants and Quanta for the
Performance Based Free Flight ATM
example embodiment Notional 3D depiction of reserved Quanta along a trajectory Notional 2D depiction of reserved Quanta along the same trajectory for a low precision navigation vehicle Notional 2D depiction of reserved Quanta along the same trajectory for a high precision navigation vehicle Operation through adjacent airspaces Example of flight plan from A to B defined by a user, contouring restricted airspace, respecting noise limits and complying with avigation easement.

Real-time change in airspace availability and rerouted trajectory

Real-time change in airspace availability and rerouted trajectory

Possible transition from prior art system to a system similar to the one presented in this example embodiment Notional depiction of the air traffic transport network and 1D Quanta

MULTIDIMENSIONAL QUANTIZATION AND DISTRIBUTED AUTOMATIC SYSTEMS MANAGEMENT

CROSS-REFERENCE TO RELATED APPLICATIONS

This application claims benefit of U.S. Provisional Application No. 62/771,311 filed Nov. 26, 2018, incorporated herein by reference.

STATEMENT REGARDING FEDERALLY SPONSORED RESEARCH OR DEVELOPMENT

None.

FIELD

This technology relates to methods and systems for automatic management that work through the quantization of all or some of the dimensions or aspects that are part of a given system, creating one or several types of Quanta. This technology also relates to Quanta-based methods and systems for automatic systems management of other applications including for example Performance Based Free Flight ATM (Air Traffic Management), Transport Networks, Road Traffic Prediction and Management, Energy Distribution, Public Network of Sensors, Local Electromagnetic Spectrum Allocation and Orbital Tracking and Traffic Management.

BACKGROUND

In the past, different systems demanded different management methods mostly due to specific systems' management specific needs such as safety, security, cost of failure, performance, redundancy, reliability and resilience; and systems' specific characteristics such as complexity, size and actual physical implementation.

It would be advantageous to provide a Quanta-based automatic management system and method that can be used to manage different problem sets.

BRIEF DESCRIPTION OF THE DRAWINGS

The following detailed description of exemplary non-limiting illustrative embodiments is to be read in conjunction with the drawings, of which:

FIG. 1 is a schematic block diagram of an example Quanta based distributed automatic system management computing system;

FIGS. 3(a) and 3(b) show time as a parameter FIG. 3(a) or as an additional dimension FIG. 3(b) defining Quanta;

DETAILED DESCRIPTION OF EXAMPLE NON-LIMITING EMBODIMENTS

Distributed Automatic Systems Management

Figure 1A:
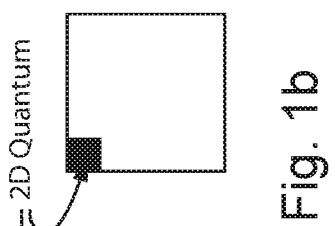
FIGS. 1(a), 1(b), 1(c), and 1(d) show examples of multidimensional quantization.

This proposed method provides an improved automatic system management by controlling/managing part or all of the system operation through the predefined properties embedded in the components of the management system itself. The creation of Quanta with properties intend to allow the programming of the rules for the system management in a way that any user, client, provider or any other type of Participant can interact with the system without the need of an intermediary or approver.

Methods to manage a system comprise defining the participants of the system and their properties; the quantization of all or some of the dimensions or aspects that are part of a given system, creating one or several types of Quanta and their properties; wherein Participants and Quanta properties allow the programming of the rules for the system management in a way that Participants and Quanta can interact with the system and among themselves; and providing automatic system management by controlling/managing part or all of the system operation through the predefined properties embedded in the quanta and/or in the participants. The method may also comprise a communication network connecting all components of the system that may allow the exchange of messages, requests, commands, transactions and also more complex, data intensive communications and storage capabilities. The method may use the components of the system that include at least the Quanta and Participants.

Some embodiments may employ centralized design choices and technologies in their implementations that limit the benefits provided by the distributed nature of this method. Examples of centralized design choices are, but not limited to, one central controller as a participant, a number of decentralized controllers as participants, use of a participant in the network as a proxy for several other participants outside the network, and approvals by a single participant programmed in the Quanta. Examples of centralized technologies are, but not limited to, a central computing system where Quanta are represented by database registries or independent code that shares the centralized infrastructure.

FIG. 1 shows an example system 1000 comprising a number of decentralized, distributed quanta controllers 1002. In this example, there can be any number of quanta controllers 1002(1), 1002(2), ..., 1002(N). These controllers 1002 may each include a processor 1004 such as a CPU (central processing unit), a GPU (graphics processing unit), an ASIC hardware based processor, a gate array, or any combination thereof. In each case, the processor 1004 is operatively coupled to non-transitory memory 1006 which may comprise random access memory (RAM), read only memory (ROM), magnetic memory, or any combination thereof. The memory 1006 may store instructions that, when executed by the processor 1004, performs quanta based processing as described herein. The various quanta controllers 1002 communicate via a network 1008 which may be any kind of network such as wired, wireless, or any combination.

In the example embodiment shown, quanta controllers 1002 each receive inputs. The quanta controllers 1002 each process these inputs according to the quanta based processing commanded by the executable instructions stored in memory 1006. Each quanta controller 1002 may process its respective inputs independently of the processing of other quanta processors, but may also coordinate distributed processing across the system 1000 as explained below in various examples.

The overall system 1000 may produce one or more outputs as shown. These outputs may be generated by one or more of the quanta processors 1002 and/or by an arbiter (not shown) comprising an additional processor that receives outputs from the various quanta controllers 1002 and generates output(s) based thereon.

As discussed above, FIG. 1 is only one example architecture for system 1000. Other examples could be centralized wherein each quanta controller 1002 is implemented by a process executing on a multithreaded computer system. In another alternative, each quanta controller 1002 can be implemented as a virtual machine within a multi-core, multithreaded processor.

A summary of the example architecture may be a quanta based system comprising a first quanta controller performing a quanta based process based on at least one quantum created from the quantization of at least one dimension; a second quanta controller performing a quanta based process based on at least one quantum created from the quantization of at least one dimension; and a communications connection that enables the first and second quanta controllers to communicate. The quanta controlled by the first quanta controller could be the same quanta controlled by the second quanta controller; or the quanta controlled by the first quanta controller could be different from the quanta controlled by the second quanta controller.

Example: Data and Information Sharing in the Distributed System

Embodiments of the proposed method define not only a system with Quanta, Participants and its Properties but also a distributed communication network that is agnostic about any of the connectivity technologies in use for managing that system. The interaction among different Quanta and Participants may encompass not only simple messages, requests, commands or transactions but also more complex, data intensive communications and storage capabilities.

In a given system, several participants may share their own data through the distributed network, in a peer-to-peer (e.g. point to point) or broadcast way. In this system, one or more participants may process this data into information, and then communicate back to the network, again in a peer-to-peer (e.g., point-to-point) or broadcast fashion. Eventually, some participants may be responsible for recording the history of particular data broadcasted through the network, while others may act as a distributed storage infrastructure available for Quanta and Participants in that given system.

Example non-limiting embodiments provide general methods to design a distributed automatic system management for a plurality of different systems, leveraging from several advancements in areas such as digitalization, connectivity (increasingly redundant and ubiquitous), distributed computational power, computation on the edge, IoT technologies (Internet of Things), Distributed Ledgers and Smart Contracts.

The improvements allow for safety, security and resilience, for example, to be provided as part of a system management method with minimum associated cost or added complexity. Example non-limiting methods may provide, for example, high security and safety without incurring high cost and/or complexity, for applications that would otherwise adopt simpler, less capable solutions.

Example non-limiting embodiments apply methods and systems to the following example applications:
 Performance Based Free Flight ATM (Air Traffic Management),
 Transport Networks
 Road Traffic Prediction and Management
 Energy Distribution
 Public Network of Sensors
 Local Electromagnetic Spectrum Allocation
 Orbital Tracking and Traffic Management.

Embodiments provide methods for distributed automatic system management that work through the quantization of all or some of the dimensions or aspects that are part of a given system, creating one or several types of Quanta. Additionally, all types of participants of the given system shall be defined. With all types of Quanta and Participants defined, the definition of their properties and the criteria for interactions within the system form the rules for the automatic system management to take place and even some of the rules that will govern its evolution.

Multidimensional Quantization

As a non-limiting embodiment, the method to manage a system may comprise the definition of the participants of the system and their properties; the quantization of all or some of the dimensions or aspects that are part of a given system, creating one or several types of Quanta and their properties; wherein Participants and Quanta properties allow the programming of the rules for the system management in a way that Participants and Quanta can interact with the system and among themselves; and providing automatic system management by controlling/managing part or all of the system operation through the predefined properties embedded in the quanta and/or in the participants. Such method may also comprise establishing communication through a network connecting all components of the system that may allow the exchange of messages, requests, commands, transactions and also more complex, data intensive communications and storage capabilities. Components means, in this example, at least the Quanta and Participants.

In non-limiting example embodiments, different dimensions of a system to be managed, each of those dimensions eventually having different natures, are quantized, creating a number of Quanta. FIGS. 1(*a*)-1(*d*) show examples of quantization for different spatial dimensions. For example, spatial dimensions may be quantized in a way that each Quantum would represent:
 a dot (nildimensional or zero-dimensional space) (see FIG. 1(*c*)),
 a length (see FIG. 1(*a*)),
 an area (see FIG. 1(*b*)),
 a volume (see FIG. 1(*c*)), or
 a multidimensional volume (more than 3 dimensions) (see FIG. 1(*d*)).

In more detail, FIG. 1(*a*) shows a typical one-dimensional Quantum—essentially a number line that is divided into discrete values such as for example the integer numbers. A value according to the FIG. 1(a) 1D Quantum would thus be defined by any integer in this example and would not take on any fractional value.

Figure 1B:
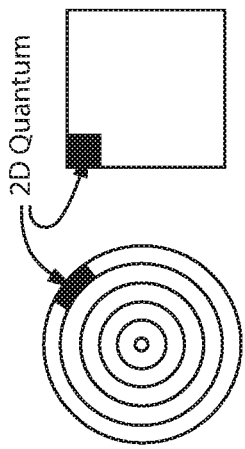

FIG. 1(b) shows two different examples of 2D Quanta. The lefthand scenario shows a series of segmented concentric circles. The designator for such a segment thus indicates (1) a particular one of the concentric circles, and (2) the azimuth of a particular segment in that particular concentric circle. The righthand scenario shows a segmented rectangular (square) area. The designator for such a segment in the square area indicates the X and Y position of the segment of a 2D array of segments within the square area.

Figure 1C:
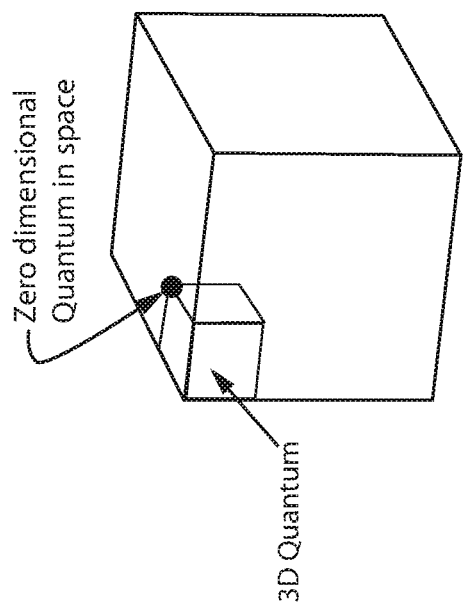

FIG. 1(c) shows an example of a 3D Quantum. The designator for each segment in the cubic volume indicates X, Y, and Z position of the segment of a 3D array of segments within the cubic volume.

FIG. 1(c) also shows that a zero dimensional Quantum may be defined within the cubic volume (or any dimensional space).

Figure 1D:
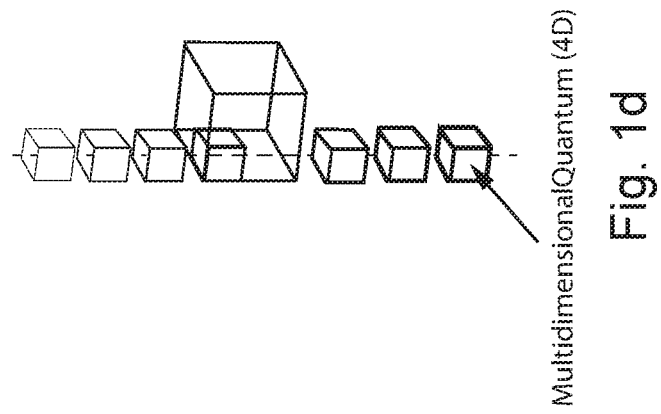

FIG. 1(d) shows an example multidimensional (4D) Quantum. This example includes a linear array of cubic volumes. A 4D Quantum designator would indicate (1) a particular one of the cubic volumes, and (2) the X/Y/Z position within the indicated cubic volume.

Any number of dimensions are possible. Any coordinate system including for example Cartesian or spherical coordinates is also possible.

If desirable, it is possible to have different Quantum types in the same system. For example, a system may be quantized in a 3 dimensional space as shown in FIG. 1(c), creating quanta that represent smaller volumes in that space, and also have a number of zero-dimension Quanta distributed in that same space. Another example would be having some of those 3 dimensional Quanta, not all of them, also representing additional dimensions beyond the 3 dimensional space (see FIG. 1(d)).

Figure 2B:
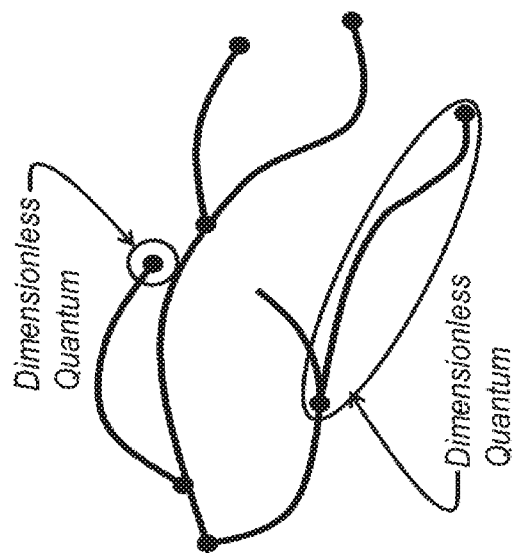
FIGS. 2(a) and 2(b) show examples of quantization for graphs.
Figure 2A:
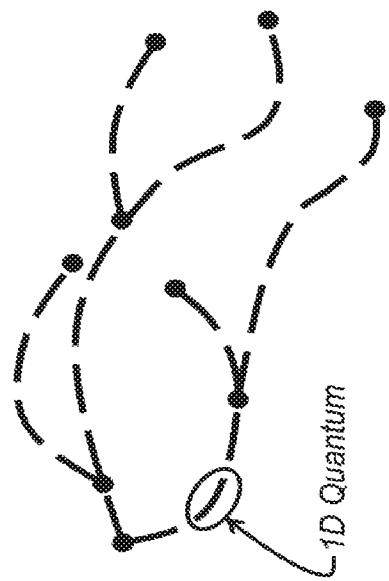
Figure 4A:
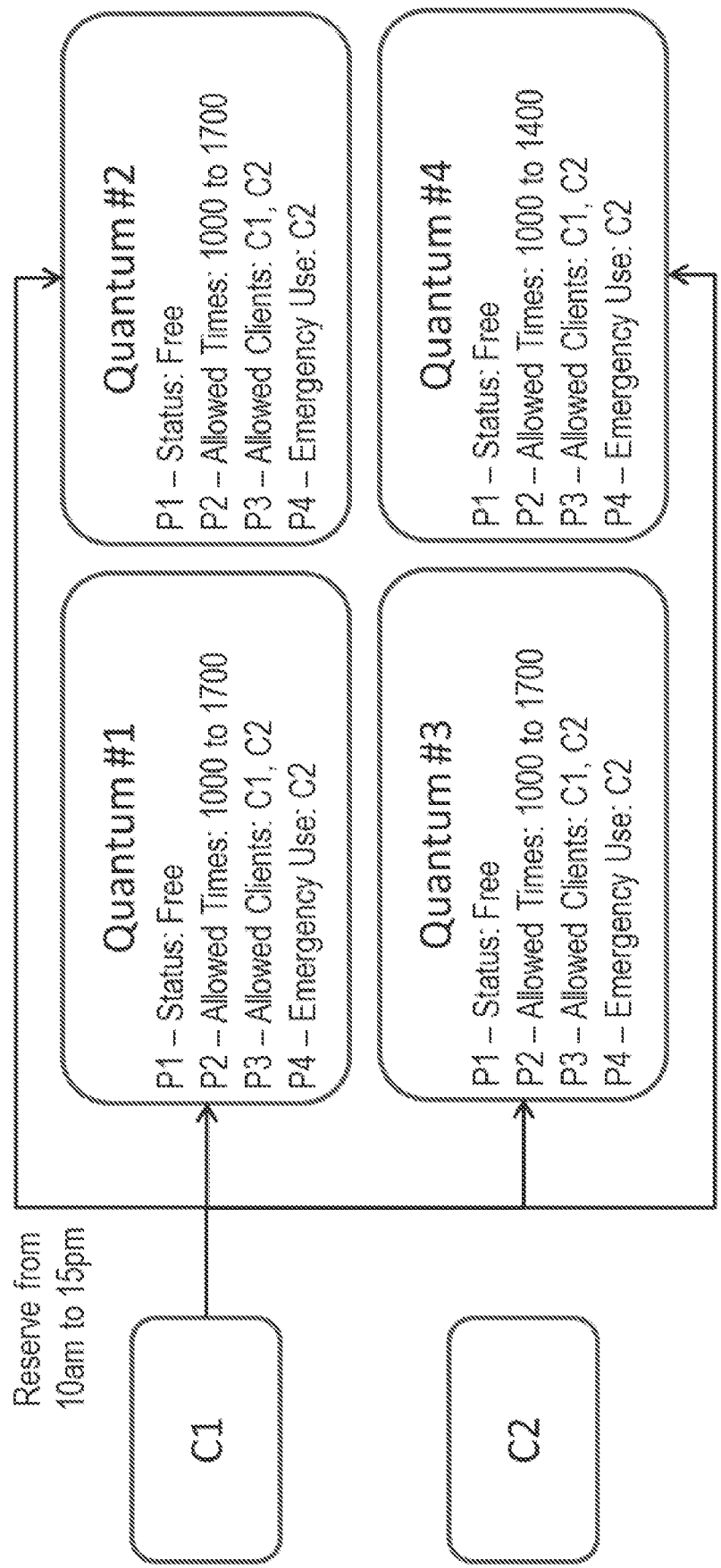
FIGS. 4(a), 4(b), 4(c), and 4(d) show an example of Automatic Management in a simple system.
Figure 4B:
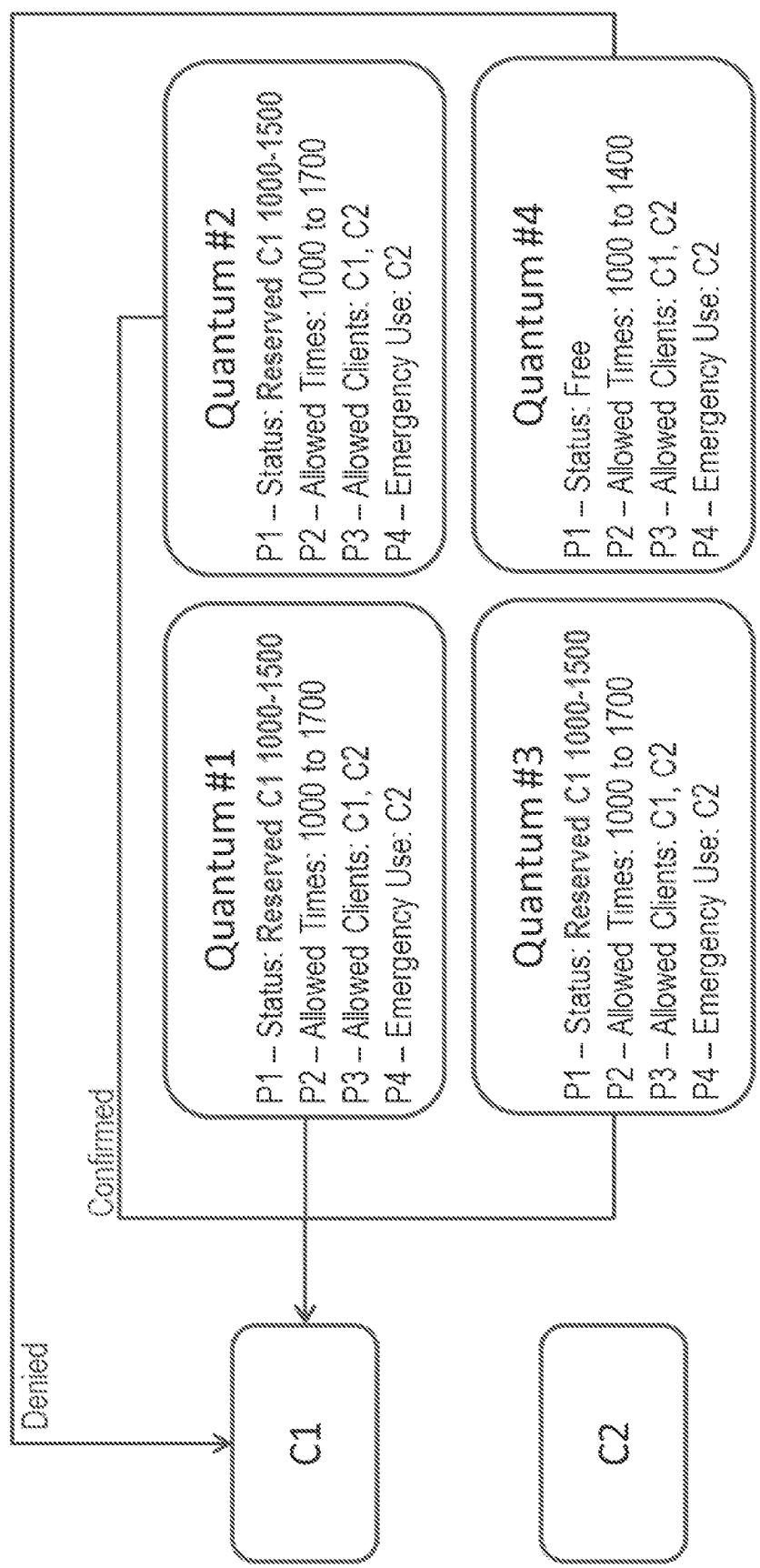
Figure 4C:
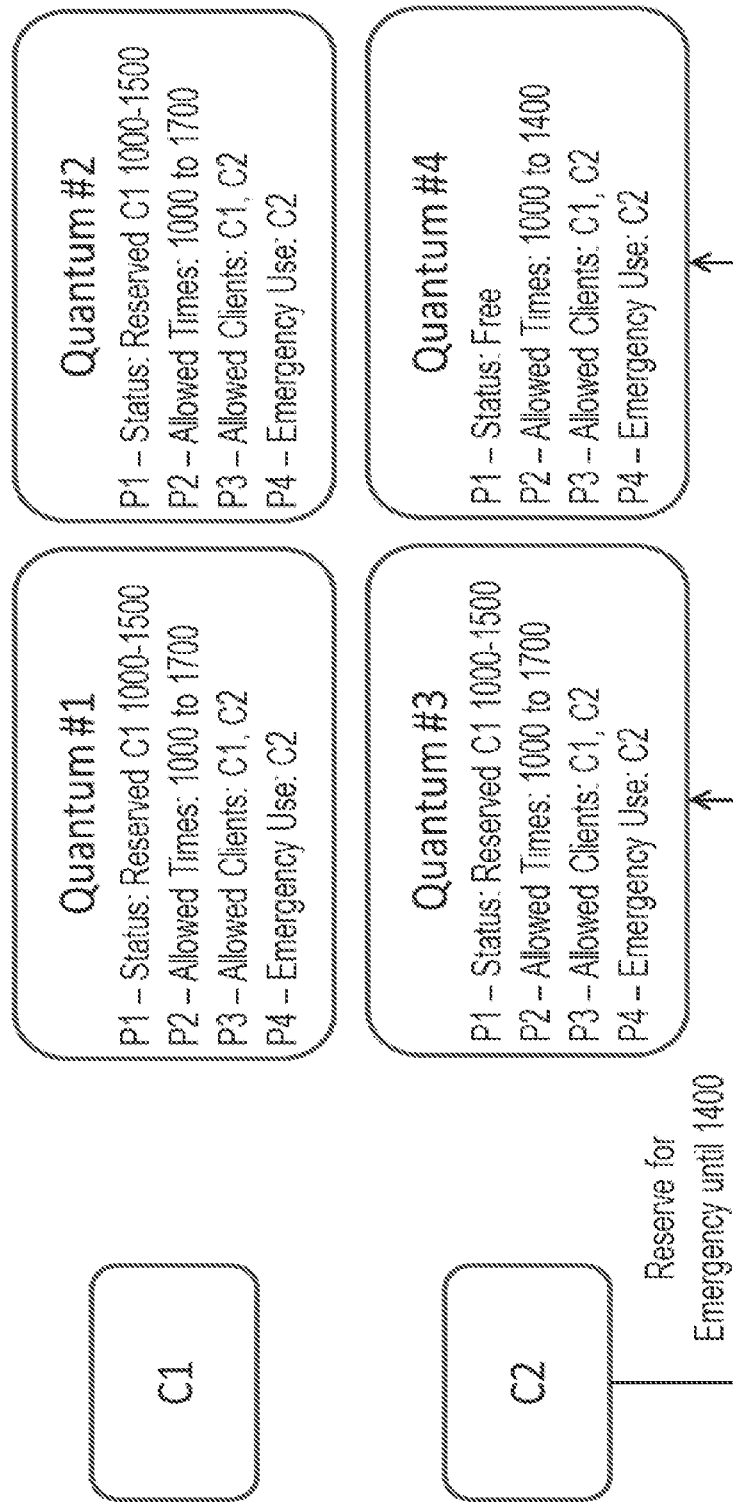
Figure 4D:
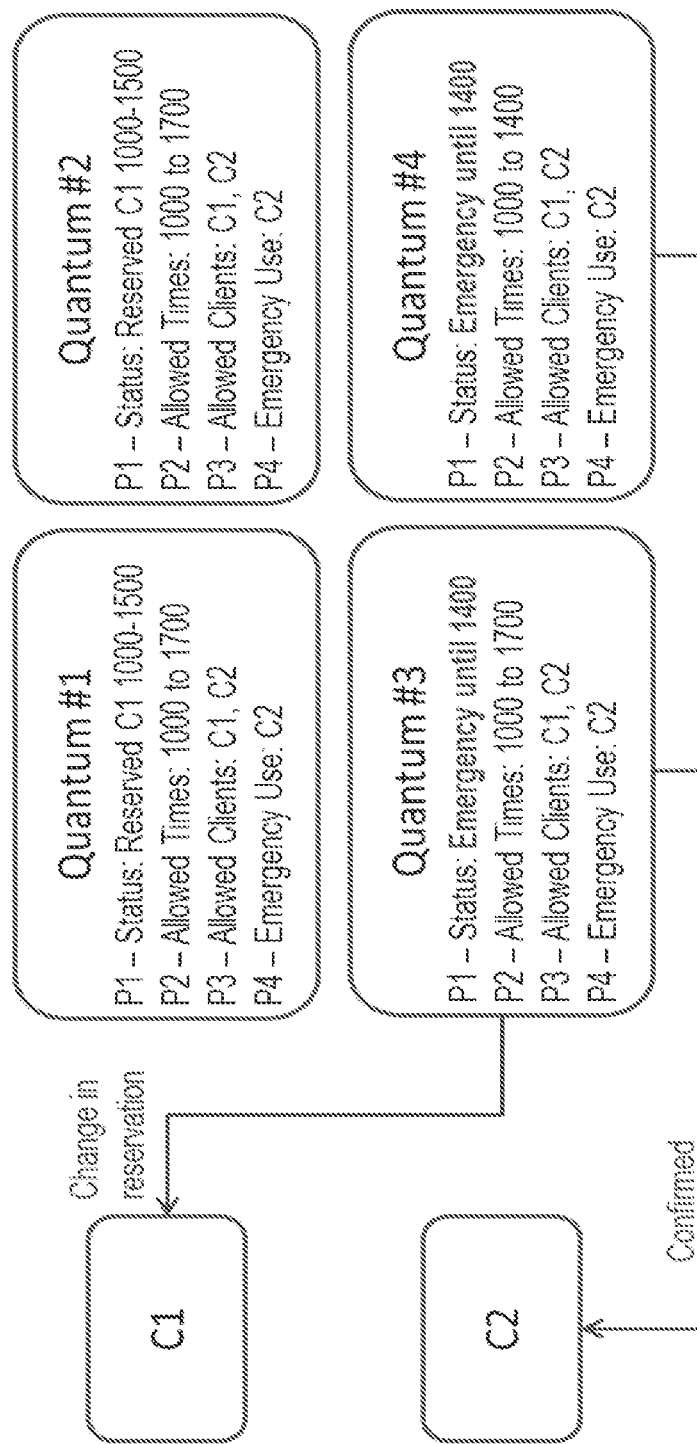

As another example, in the case of systems represented by Graphs, the edges could be quantized in a way that their length is divided in several Quanta (one-dimension quantization along each edge of the graph) as shown in FIG. 2(a). Alternatively, each edge as a whole or each vertex (intersection between two or more edges) could be a Quantum (dimensionless) as shown in FIG. 2(b).

For systems that are not timeless, time may or may not be an additional dimension defining the creation of Quanta, depending on the system nature, behavior, goals and even what is more suitable to a particular desired implementation.

In the case where time is a dimension defining the creation of Quanta, one would see a Quantum or several Quanta representing only a moment in time for that system and a sequence of Quanta would be needed or used to represent time progression or sequence. See FIG. 3(b), which shows a sequence of 3D Quanta of the type shown in FIG. 1(c), but organized in a time progression or sequence such that time is an additional (in this case a 4) Quanta dimension.

In the case where time is not a dimension defining the creation of Quanta, it could be considered as an additional parameter to interact with Quanta and participants as well as to record system history—see FIG. 3(a). In this case, time could be a continuous or a discrete physical quantity.

Each Quantum represents the minimum resolution in all quantized dimensions to manage a given system. Each Quantum can have a number of properties assigned to it. Properties can be equal among all Quanta, equal among parts of the Quanta or unique for each Quantum. Definition of properties may take in consideration all sort of factors that relate to the system, regardless of those being internal or external to the system, and are defined based on each systems' natural dynamics as well as the management and governance (i.e., rights and criteria to change the rules) needed for its intended operation.

Besides the Quanta with properties, embodiments of this method may also define users, clients, providers and other types of participants that interact with Quanta and among each other in a number of ways. Similar to the Quanta, participants also have properties registered in a way that Quanta and other participants may interact with them. Examples of such participants' properties may be, but not limited to:

current status,
current state,
identification,
type of participant,
type of operations allowed in the system,
type of operation being performed,
expiration dates,
history of activities, capabilities,
performance,
authority over some aspects of the system,
real-time data from the participant,
services provided to other participants,
other.

Different participants and different Quanta have different rights and duties over properties of other Quanta and participants. This aspect of the system management and governance technologies proposed by this method provides advantageous capabilities and flexibilities.

Example Distributed Automatic Systems Management

For example, Distributed Automatic Systems Management considering a system depicted in FIG. 4 (a) where the Quanta represents a resource that can be reserved by 2 types of participants, clients C1 and C2. In this case, client C2 has rights for emergency use regardless of any current or planned reservation. Each Quantum has a property indicating that it is Reserved, Free or Reserved for Emergency at any time (P1). Also, each Quantum has properties establishing the times it can be reserved (P2), and what kind of (or which) client is allowed to reserve that Quantum (P3) and that C2 has the right for emergency use (P4).

If C1 interacts with 4 Quanta to reserve them but one has a rule, embedded in a property, indicating that it cannot be reserved at the requested time, then C1 receives 3 confirmations from the 3 Quanta that were successfully reserved and I "deny" from the 4th Quanta. See FIG. 4(b). Later, C2 requests 2 Quanta to be reserved for emergency. However, one of them is already allocated to C1. See FIG. 4(c). Since C2 has priority, this Quantum will be allocated to C2 and both C1 and C2 will be notified, with cancellation of reservation and confirmation, respectively. See FIG. 4(d).

This is a very simple example to illustrate how management rules could be embedded in Quanta and Participants properties. However, those management rules could be a lot more complex, with logical operators, algorithms and encryption for security purposes.

Beyond automatic system management, Quanta and participants properties also enable embedded governance rules to support system evolution as well as resolve management decisions in case any issue cannot be solved automatically.

Figure 5A:
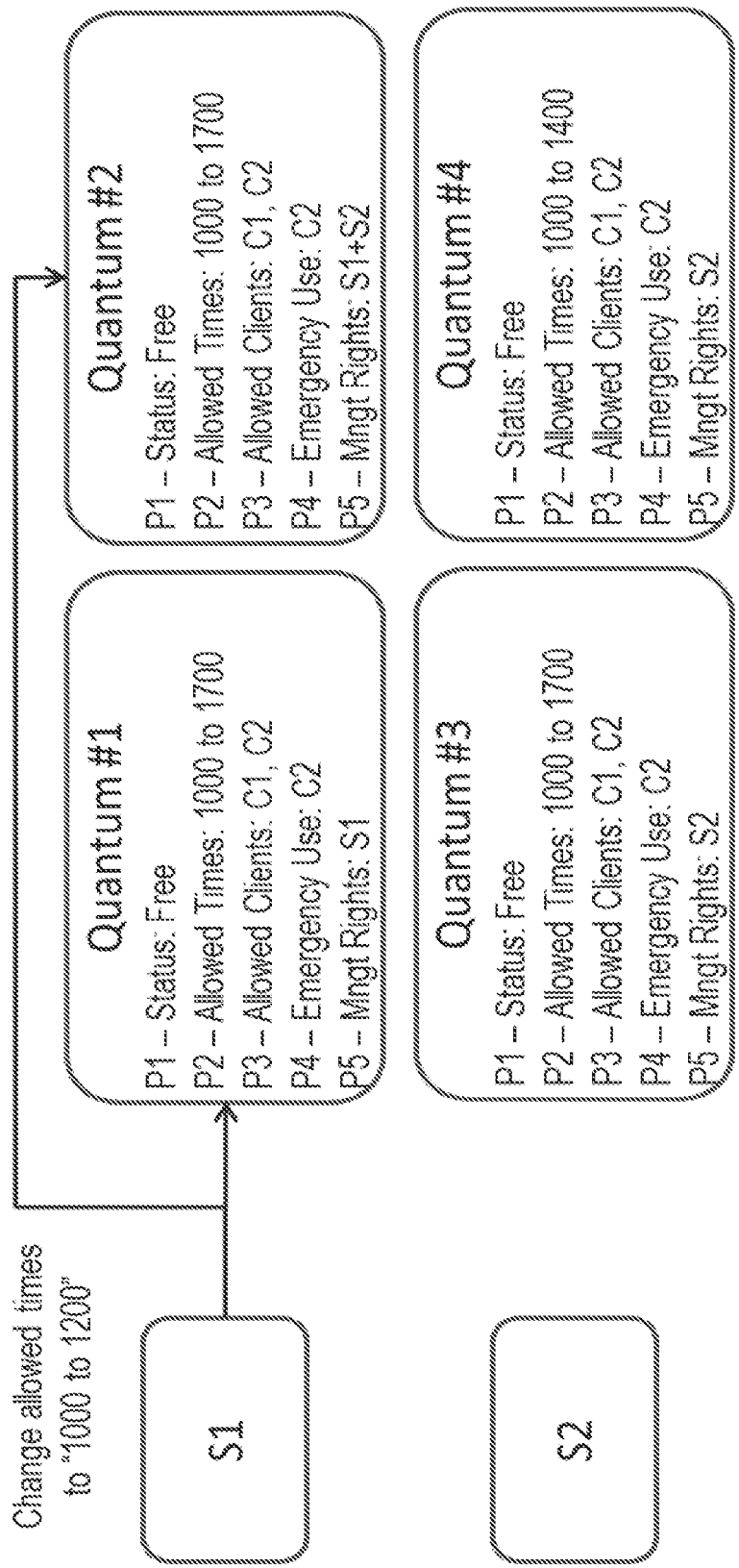
FIGS. 5(a), 5(b), 5(c), and 5(d) show an example of embedded Governance in a simple system.

For example, in the same system previously described, consider that participant S1 has rights to change management rules for a given Quantum, participant S2 has the same right for 2 other Quanta and both should be in agreement to change the rules for a fourth Quantum. See FIG. 5(a).

Figure 5B:
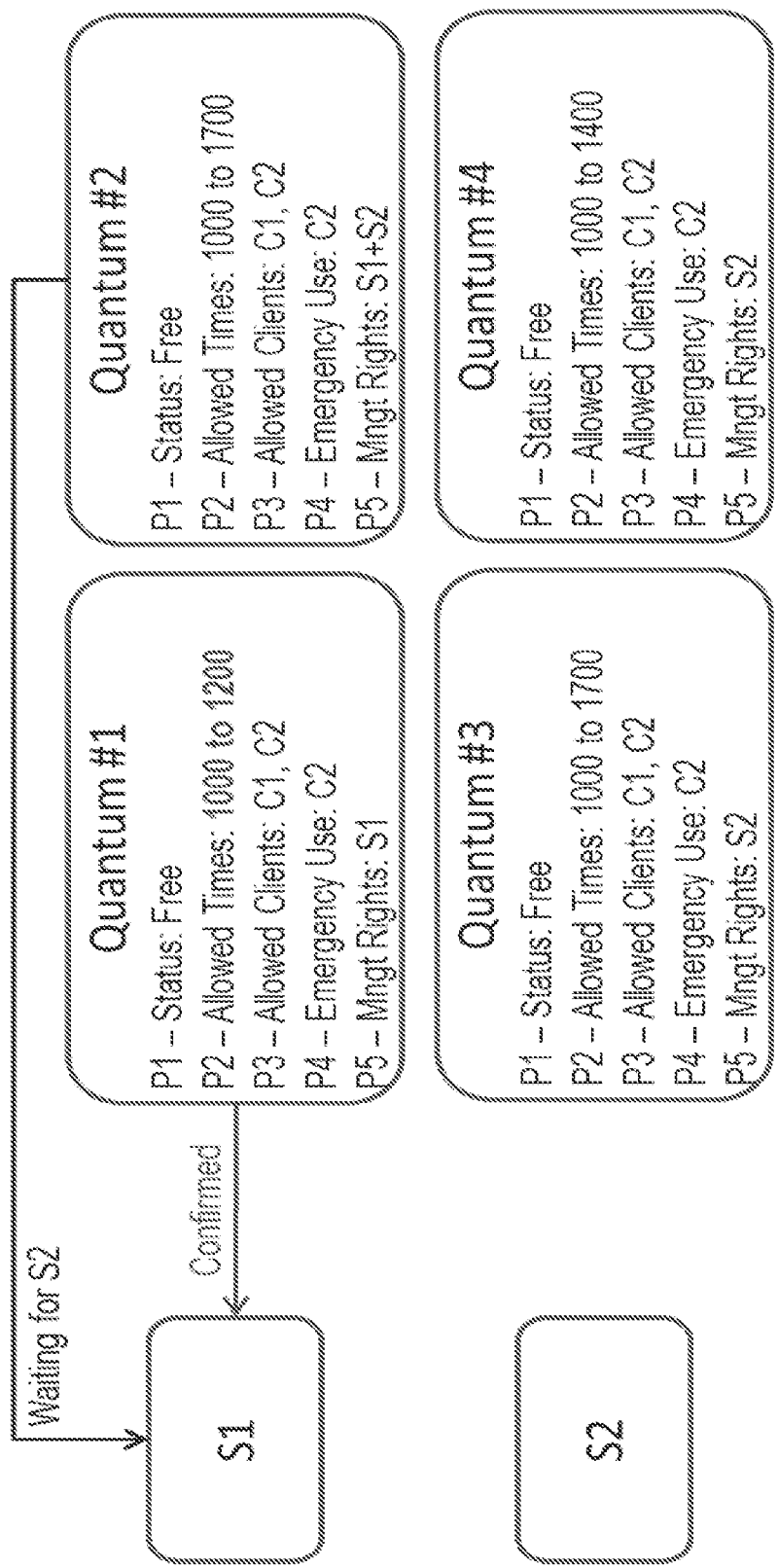
Figure 5C:
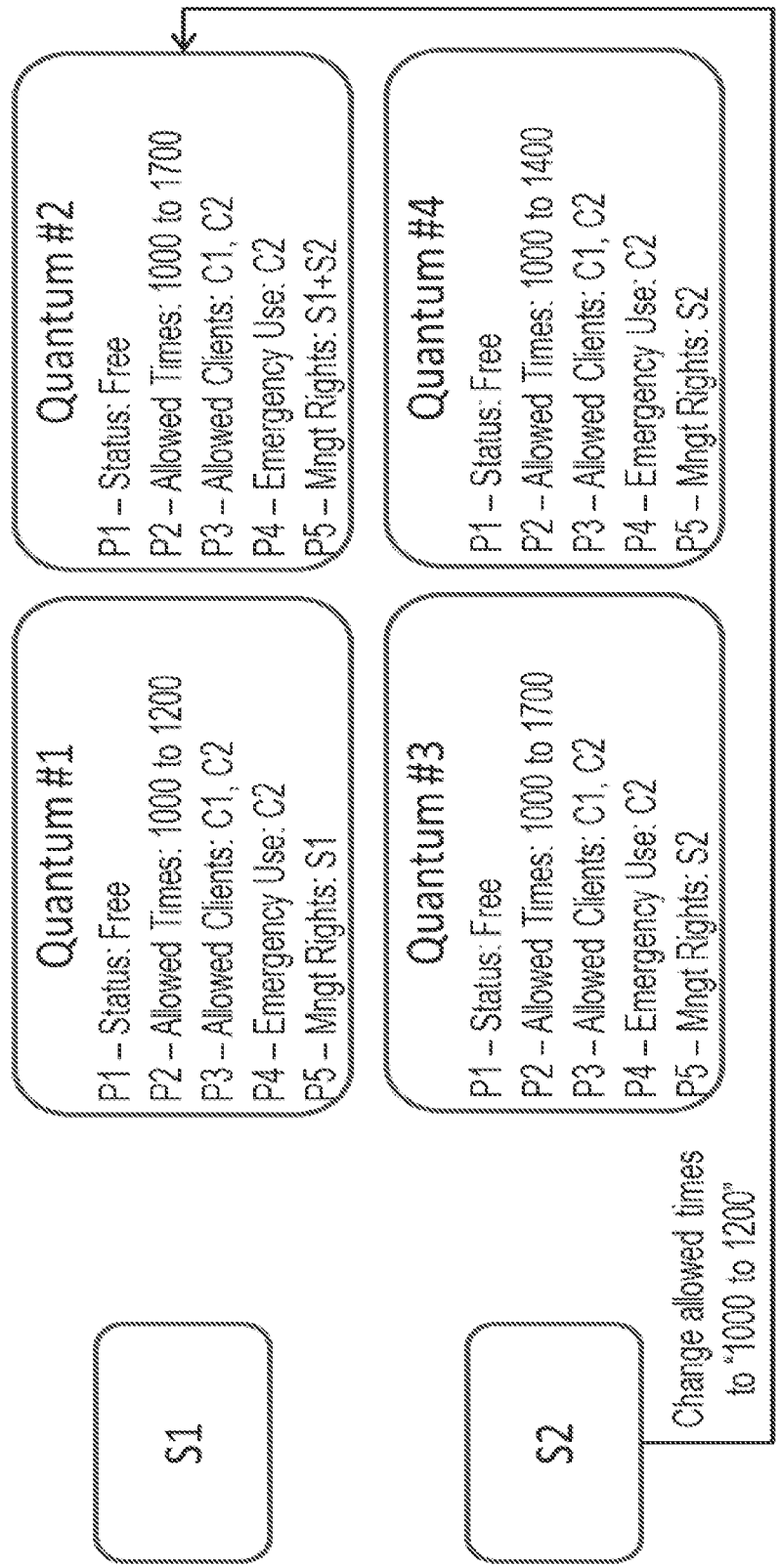
Figure 5D:
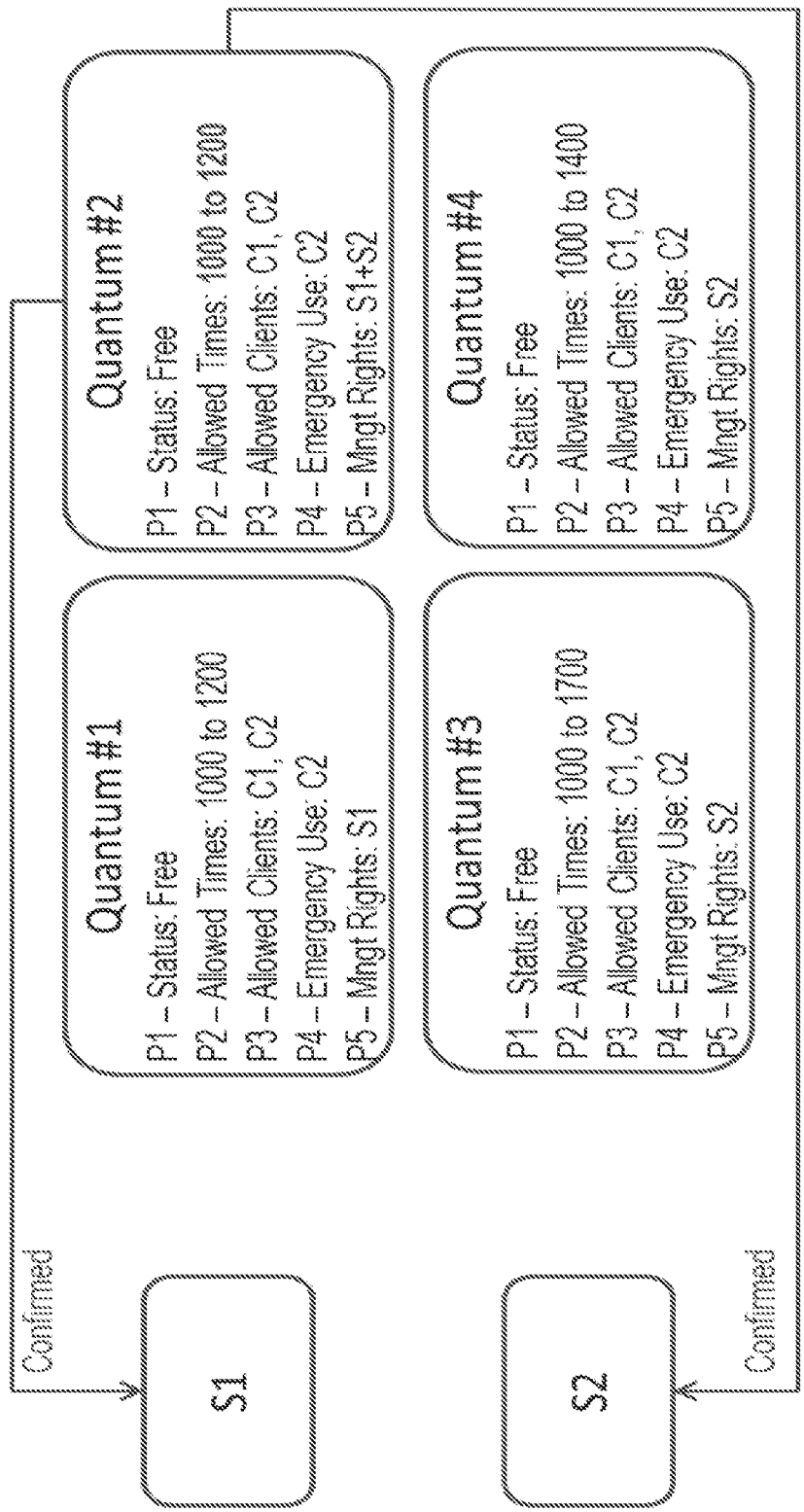

In this scenario, if S1 defines new rules and updates all Quanta it has rights on, then the Quanta with rights shared with S2 will not make changes effective until S2 also updates it, regardless of being a change that should be effective immediately or in a future time. See FIGS. 5(b), 5(c), 5(d).

The proposed method leverages the benefits associated with distributed systems such as reliability, resilience, accessibility, scalability and increased security. Particularly, embodiments of the proposed method may maximize these and other benefits commonly associated with distributed systems when designed for and implemented using DLTs (Distributed Ledger Technologies) capable of running code embedded in the distributed ledger, what is commonly denominated as Smart Contracts. Implementation of DI Ts may be in a variety of ways, based on Blockchain (in any of its multiple flavors), DAG (Distributed Acyclic Graph) or any other technology of the kind, each of these implementations having specific pros and cons in terms of performance, functions, security, computational power required for consensus, etc. In such embodiments, possible arrangements would include a single Smart Contract in a single distributed ledger representing each Quantum, several Smart Contracts managing several types of Quanta each using different distributed ledgers and a myriad of other combinations. In such embodiments, distributed participants of several different types perform the processing of DLTs' consensus algorithms and Smart Contracts' execution, creating a distributed logical infrastructure that translates into a distributed physical infrastructure.

Besides the distributed characteristics of the DLT with Smart Contracts, this approach also provides flexible and powerful tools for implementing the management rules accompanied by increased security. For example, digital signatures based on hash functions and/or a transactions history may be provided that are, in practical terms, unchangeable and/or unbreakable.

Example: Performance-Based Free Flight ATM—Air Traffic Management

Figure 6:
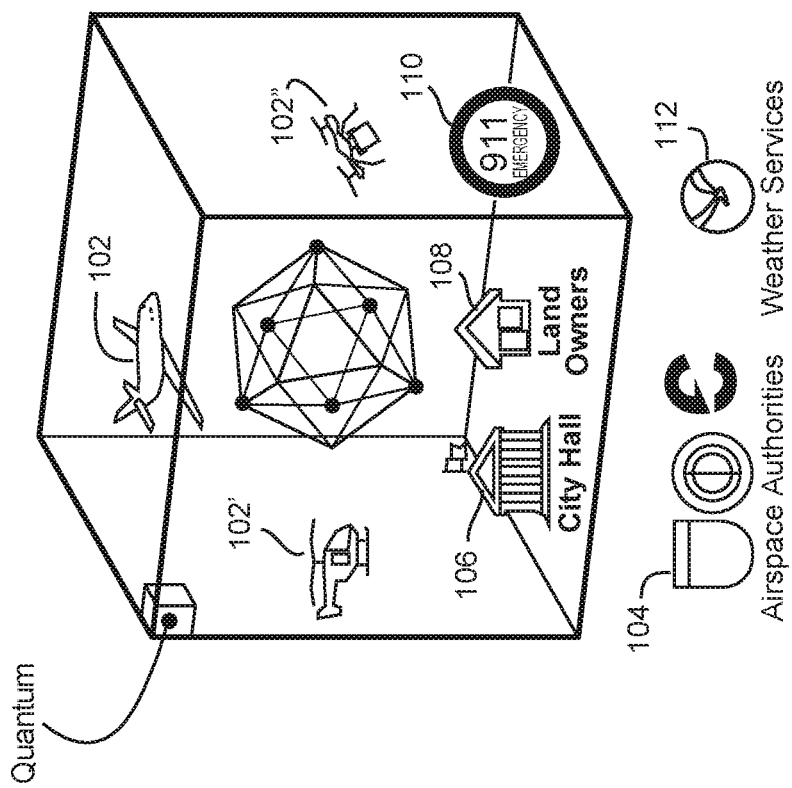
FIG. 6 shows Participants and Quanta for the Performance Based Free Flight ATM example embodiment.

One non-limiting example practical embodiment shown in FIG. 6 presents a method and a system for a distributed automatic performance-based free flight air traffic management. The elements of such method and system are presented and should provide a clear understanding of the suitability of the proposed method for the air traffic management problem.

Participants for this example may include:
airspace users (flying vehicles 102).
fleet operators.
airspace authority 104.
municipality authority 106.
landowners 108.
emergency services 110.
weather information providers 112.
air traffic surveillance providers.

Concerning the Quanta, a defined airspace in this example is divided in a number of small 3-dimensional volumes. Eventually, those volumes in this example would be small to the point that some aircraft or other flying vehicles in that airspace would not fit within their physical dimensions. Each of these small airspace volumes defines a Quantum, and time is a parameter for interacting with Quantum and Participants, not a dimension that defines Quanta.

It is considered that Quanta will be represented by Smart Contracts in a distributed ledger, in a way that its only requirement for operation would be the availability of ubiquitous redundant connectivity. Of course, even with redundancy, backup systems and emergency procedures would cover the abnormal operation scenarios where there is no connectivity.

This example has no other types of Quanta besides the one already presented nor additional dimensions in the proposed Quanta. Alternatively, additional types of Quanta could be used to deal with aspects of the air traffic management problem. For instance, instead of considering weather conditions as a property in each of the already defined Quanta, one could define different types of Quanta, eventually with the same 3 dimensional size, different 3 dimensional sizes or dimensionless (just a point in space), and use these Quanta for one or various weather related purposes.

Considering weather aspects such as wind, temperature, humidity, pressure and precipitation as additional dimensions in the already created type of Quanta may not be practical in some cases. Quanta dimensions are quantized, and there would be no advantage within this example ATM problem as modelled herein to deal with a different single Quantum for each different combination in values for wind, temperature, humidity, pressure and precipitation. Eventually, this type of arrangement could be suitable to other applications or a different approach for the ATM or weather problem.

In embodiments where each Quanta is represented by Smart Contracts in one or more distributed ledgers, the approach with different types of Quanta may bring some governance benefits for system evolution when updating the Smart Contracts that represent die Quanta itself. For example, it may facilitate an updated version of the Smart Contract for the "Weather Quanta" to be deployed by Weather Providers 112 and the Airspace Authority 104 only, without touching the Smart Contracts for "Traffic Quanta". Using a single Quanta for both Weather and Traffic, any changes in the Quanta due to weather would demand not only the involvement of Airspace Authority 104 and Weather Services 112 but also Municipality Authorities 106, Landowners 108, Emergency Services 110 and Air Traffic Surveillance Providers in spite of the fact that those participants have no relation to how weather aspects should be managed.

This example embodiment implements a distributed automatic management for performance-based free flight. In a flight plan, the amount of Quanta that is reserved around a vehicle 102 varies according to its navigation precision and speed, in a way that it surrounds the vehicle, accounting for its navigation precision in different speeds, variations in take-off time and all necessary safety margins.

A performance-based approach maximizes airspace utilization by allowing better equipped, better performance vehicles 102 to optimize their trajectories and reduce separations while assuring that less equipped, reduced performance vehicles also have access to the airspace by reserving a larger airspace volume for their operation. All this takes place with no compromise on safety margins, which could be largely conservative for initial operations and then reduced with time as operational experience accumulates. Safe and efficient free flight has always been the airspace holy grail. An open sky that allows users to make direct flights from A to B, not restricted by corridors, navigation aids or ATM clearances is highly desirable.

Figure 9:
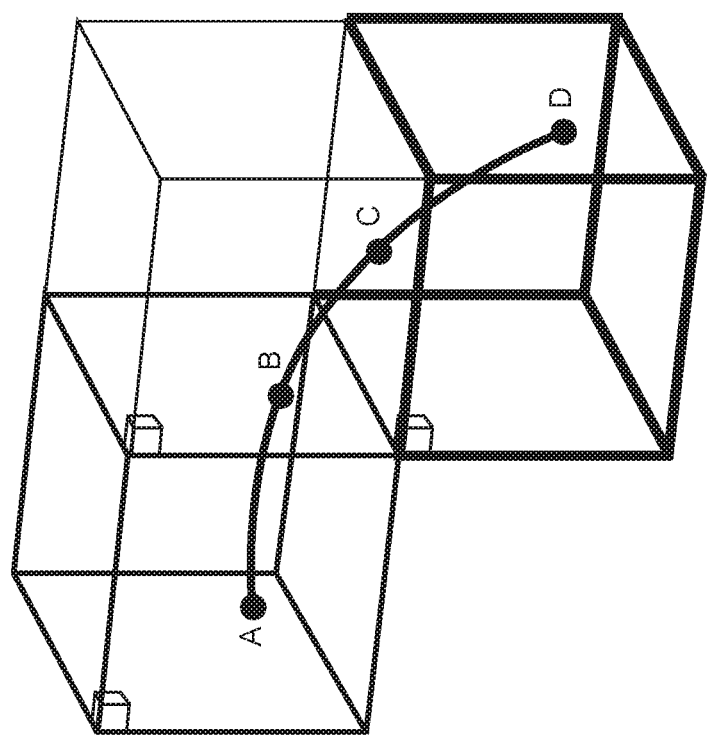
FIG. 9 shows operation through adjacent airspaces.

The extension of the managed airspace in this embodiment example is considered to be of a metropolitan size. Adjacent areas could apply the same system, defining different participants, in a way that users could fly through different airspaces in a transparent way combining a number of flight plans, each for a different airspace, passing through connection points. See FIG. 9. Besides helping in the overall performance of the system by limiting the amount of Quanta, Participants, Users and transactions within a distributed network, an arrangement like this also helps with rulemaking. Rulemaking for local airspace would involve only the participants associated with that local airspace, such as municipalities 106, landowners 108 and local emergency services 110. Any update would not affect adjacent airspaces and their participants.

Concerning network services, in this example weather information providers 112 and air traffic surveillance providers receive data from users and participants, besides other sources of data. Users flying in that airspace may provide data coming from a variety of onboard sensors that measure temperature, pressure, humidity, winds, turbulence, gust winds, data from weather radars, images of clouds, images of precipitation in areas nearby and detected lightning strike as some examples. The same applies to ground meteorological stations. From other participants and data sources, weather information providers could receive weather information from microburst/windshear airport radars, satellites, nationwide weather services, notifications from government agencies and many others. The Weather Information Provider would process all those data, for example using Data Fusion and Big Data algorithms, and then broadcast to users. This broadcast could be through the update of Quanta properties using the distributed network or direct to users through other communication channels.

For traffic information providers, the concept is the same. Onboard sensors from users detect nearby traffic and share this information with the traffic information providers using the distributed network. Onboard sensors, besides users own GNSS receivers, could be radars, cameras, LIDARs and others, most of which will become ubiquitous as autonomous flight becomes the norm. Eventually, this data sharing would be monetized, motivating operators to have better equipped vehicles. Besides that, many other data sources could be part of this arrangement, among them the current ATM infrastructure that would be seamless integrated until decommissioned.

This arrangement for traffic monitoring and surveillance would allow not only the monitoring of the users but also the identification of non-collaborative vehicles and other threats within an airspace with ever growing precision. For example, a user's onboard short-range radar and LIDAR systems as well as ground cameras positioned around a nearby landing pad may identify a bird swarm or even one single bird. Based on the known accuracy of those sensors, a traffic information provider would be able to define its position, speed and flight direction, apply proper safety margins and broadcast this information to all nearby users. The same would happen with any non-collaborative vehicle flying in that airspace.

In this arrangement, small vehicles that need to operate in the airspace, and which would be highly penalized in performance if required to carry additional transmitters and processing power, may operate in the network using a proxy. In another use-case, small recreational drones may stay out of the controlled airspace, flying within its altitude limits, geographical limits and, in some cases, only broadcasting their positions to the network.

Traffic providers, Airspace authority 104 or other participants would be technically capable to perform airspace monitoring and surveillance, calling out vehicles 102 that are deviating from their planned trajectory and detecting non-collaborative flying vehicles. In some examples, the rules within the system, that should also consider security and user privacy issues, shall grant this capability only to the proper participants with proper level of access to users' private information.

TABLE 1

Example of Quanta dimensions and its properties

| Quantum Dimensions | Example of Quantum Properties | Comments |
|---|---|---|
| Latitude Longitude Altitude | Status: Free, Reserved, Closed for Public, Terrain, Structure, Margin | Margins could be used for safety, privacy or even preserving scenic views from a swami of flying vehicles. |
| | Maximum Noise: 60 dBA; 55 dBA from 10pm to 6am; exception for Emergency Services users | Denotes maximum noise at that point in space, and values/criteria varies for each Quantum based on distance to affected parties. |
| | Minimum Speed: 50 mph; exception for Emergency Services users | Minimum speed limits could be used for privacy issues or preserving traffic flow in dense regions. |
| | Maximum Speed: 100 mph | Safety limit based on the margins designed in the airspace. |
| | Right to change status to closed: Airspace Authority or Emergency Services | For example, Emergency Services could have this right limited to any Quantum up to 500 ft |
| | Right to override reservation: Airspace Authority or Emergency Services | For example, Emergency Services could approve a flight plan overriding previously reserved Quanta. Affected users would be notified and submit a new flight plan. |
| | Avigation Easement: identification of the associated Landowner | If the Quantum represents an airspace immediately above a private property, the owner may have an Avigation Easement in place to control access to that airspace, define noise levels, operating hours or any other criteria. |

TABLE 2

Example of Participants and its Properties

| Type of Participant | Examples of Participant Properties | Comments |
|---|---|---|
| Airspace Users | Vehicle identification, Operator Identification, Pilots Identifications (if applicable), Type of Vehicle, Types of allowed operations, Flying Performance, Noise vs Speed in Max loading | Several participants of this type in a given airspace |
| Airspace Operators | Identification, Type of allowed operations | Several participants of this type in a given airspace |
| Airspace Authority | Identification, fees when applicable | A single participant of this type in this example, with rights over the whole airspace. |
| Local Airspace Authority | Identification, fees when applicable | E.g., Tower Control, Landing Pad Control. Several participants of this type in a given airspace. |
| Municipality Authority | Identification, fees when applicable | E.g., City Hall, Transit Authority |
| Landowners | Identification, "toll fees", price calculation criteria, time restrictions | Landowners with avigation easements. Several participants of this type in a given airspace. |

To define a flight plan, a user must take in consideration the vehicle 102's characteristics, the availability of the airspace and the rules programmed in the Quanta to be reserved. The user builds a flight plan, eventually applying optimization algorithms for time, distance, energy, cost or any other metric. The user submits the flight plan to the distributed network. The distributed network processes the flight plan, and the consensus algorithm confirms that all criteria are met and changes the "status" property in all affected Quanta from "free" to "reserved" in different times, according to the planned execution of the flight plan.

Figure 8A:
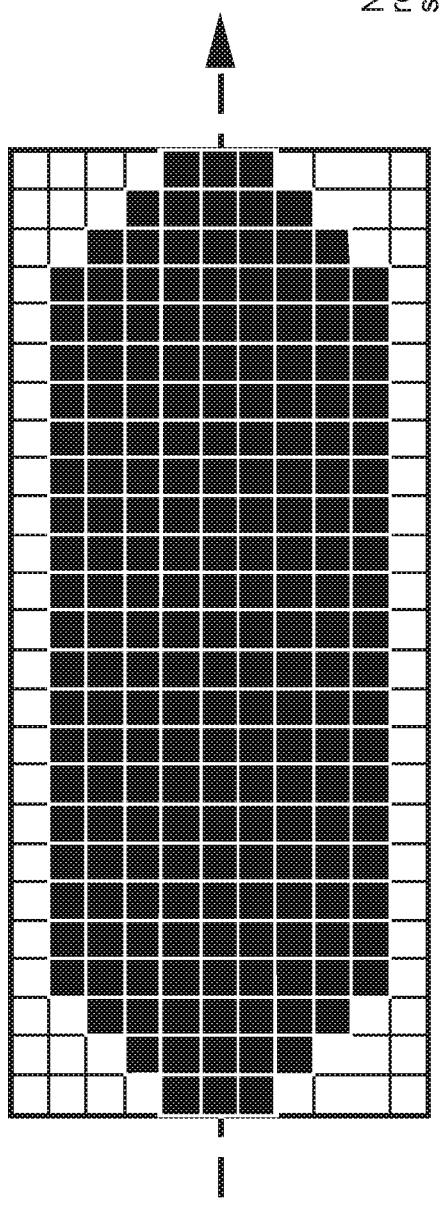
FIGS. 8(a) and 8(b) show notional 2D depiction of reserved Quanta along the same trajectory for a low precision navigation vehicle and a high precision navigation vehicle, respectively.
Figure 8B:
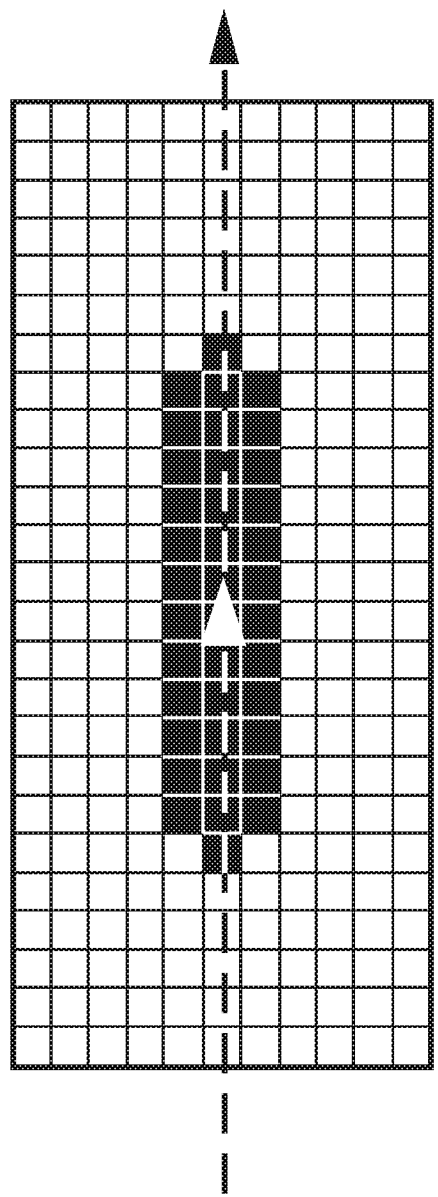

As examples of how free flight performance-based rules would affect flight plans, quieter vehicles 102 would be able to fly closer to buildings than noisier vehicles. Vehicles with better navigation precision would be able to use better routes and reserve less Quanta along the way (see FIGS. 8(a) 8(b)), eventually paying less for the use of the airspace. Less reliable vehicles 102 that do not count on multiple design redundancies would not fly over densely populated areas.

Figure 10:
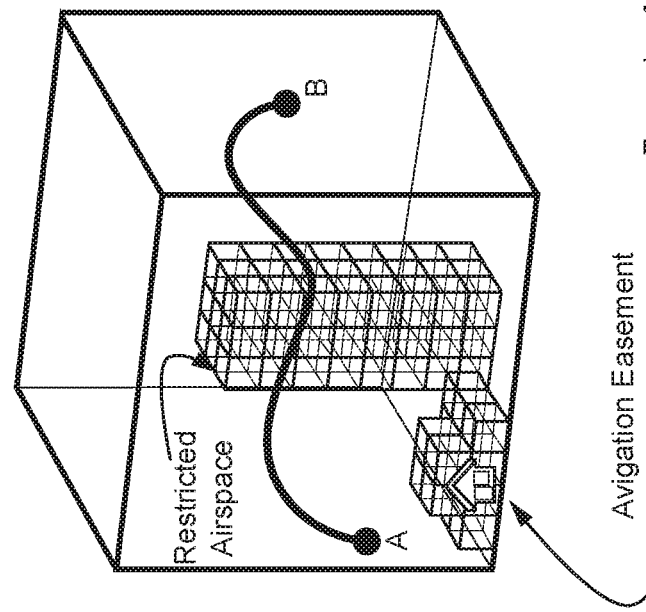
FIG. 10 shows an example of a flight plan from A to B defined by a user, contouring restricted airspace, respecting noise limits and complying with a navigation easement.

Additionally, landowners 108 that have rights over the airspace immediately above their properties may make use of Avigation Easements to grant access to that airspace, having the Avigation Easements programmed in the Smart Contracts associated with the Quanta that represent that airspace. Besides access granting, additional provisions in the Avigation Easements may eventually define allowed times for overflight, types of operation and toll fees. See e.g., FIG. 10. The distributed Smart Contracts would process all those aspects and then automatically approve the flight plan.

Figure 11B:
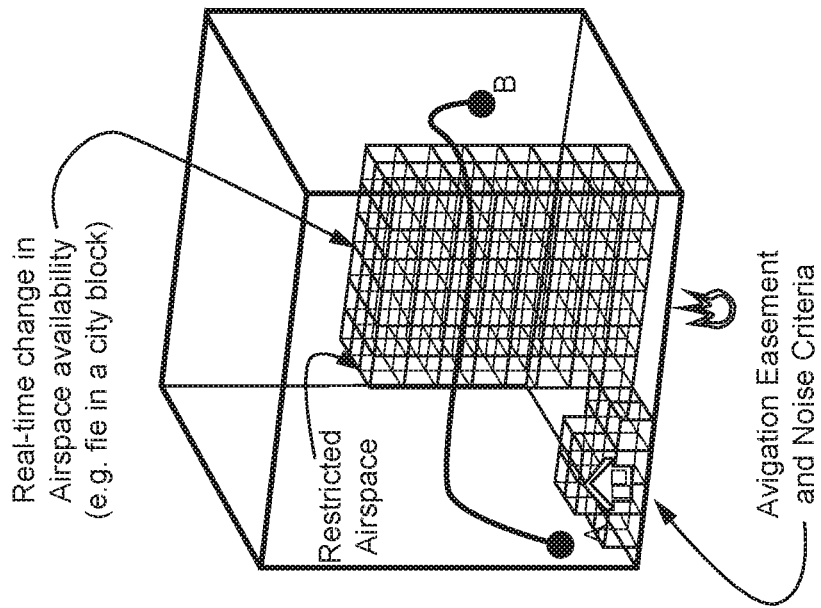
FIGS. 11(a) and 11(b) show Real-time change in airspace availability and rerouted trajectories.
Figure 11A:
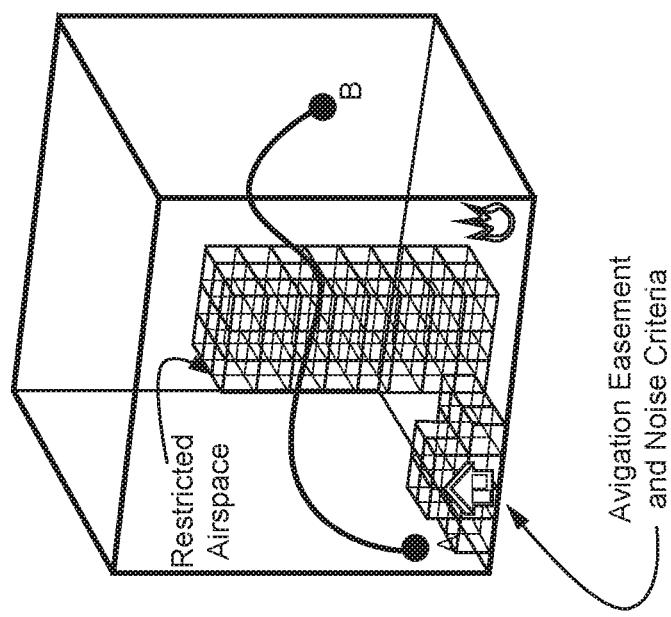

System operation is fully automatic but a series of "emergency buttons" that could be activated by humans or other independent systems may be available for participants. For instance, in case of fire in a city block, emergency services may be able to close the airspace above that fire. Emergency services 110 rights to close such airspace are programmed in the Smart Contracts following the applicable local law. See FIGS. 11(a), 11(b).

As soon as part of the airspace closes, the vehicles 102 with affected flight plans would receive a notification and then go to an alternate or submit a new flight plan to the network. Priority could be assigned to vehicles already flying and margins could be increased to ensure rerouting will be possible even in the most stringent scenario.

Figure 12:
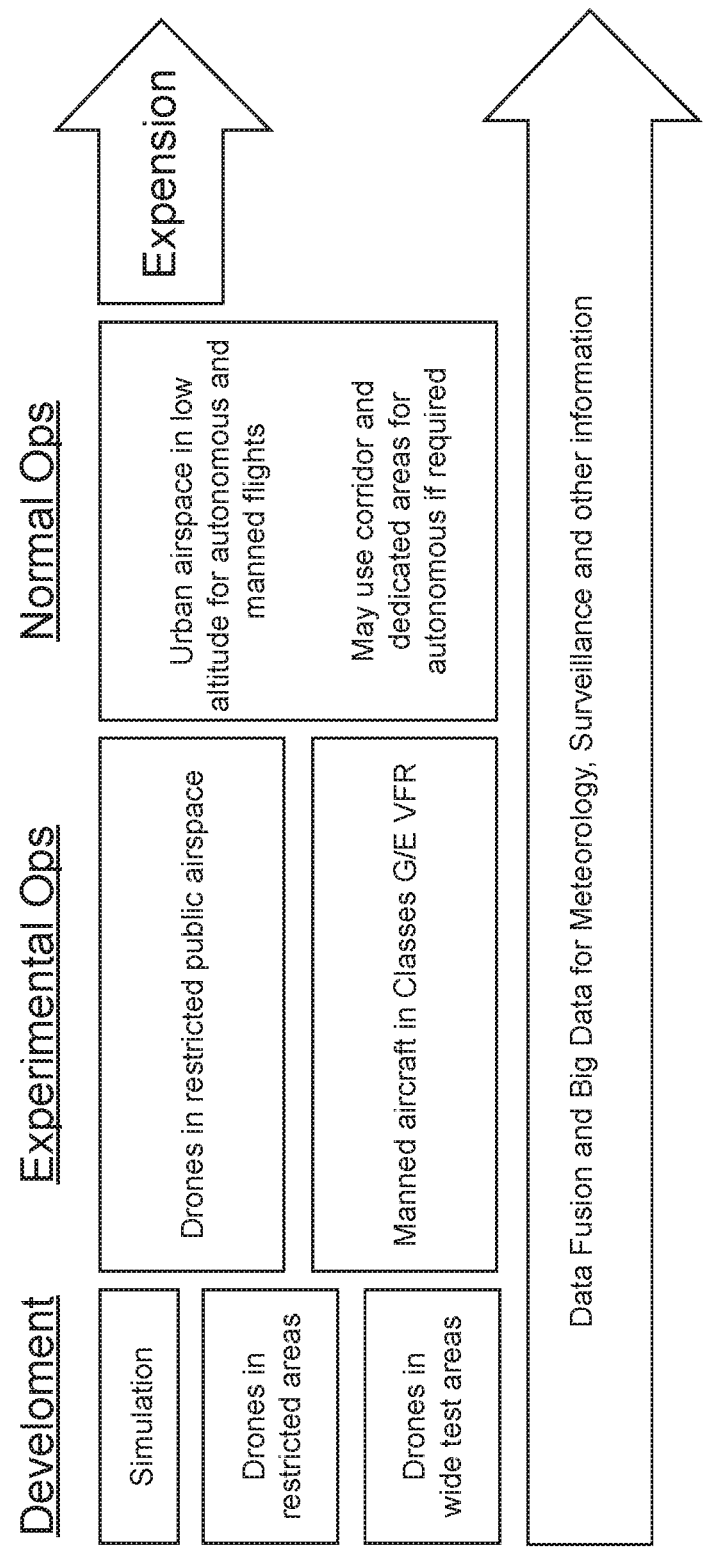
FIG. 12 shows a possible transition from prior art system to a system similar to the one presented in this example embodiment.

For transitioning from the prior art airspace management system to a system similar to the one presented in this example embodiment, after a development using extensive simulation, all testing and initial operations could take place in restricted parts of the current airspace arrangement and make use of unmanned vehicles only. See FIG. 12. After these initial steps, the system could then migrate to other parts of the airspace.

Additionally about the implementation using DLTs, its current performance in terms of transactions per second may not be enough to support an arrangement as proposed in this ATM example, with an extremely high count of Smart Contracts to be processed for a single flight plan. However, DLTs' performance numbers are improving fast (e.g., DAG—Distributed Acyclic Graph and consensus algorithms not based on PoW—Proof of Work). Additionally, many current, well know DLTs are permission-less networks that operate with a worldwide footprint. For this ATM system, the network may be permissioned (all nodes are known), allowing the use of faster consensus algorithms. Also, the vast majority of users are geographically closer and the selected DLT technology may allow sharding, helping to further decrease delays and achieve consensus in fewer steps, respectively.

On top of DLT evolution and its characteristics for the ATM system in the example, the system proposed here may also take advantage of "compression techniques" for participants to communicate with the Smart Contracts that represent the Quanta. Instead of a single transaction for each Quanta, a single or few transactions for each flight plan is possible, in such a way that each transaction has the information required to build the complete flight plan, identifying each affected Quanta, locally in all nodes that are performing the consensus for that specific transaction in the network.

Example: Transport Networks Management

Figure 13:
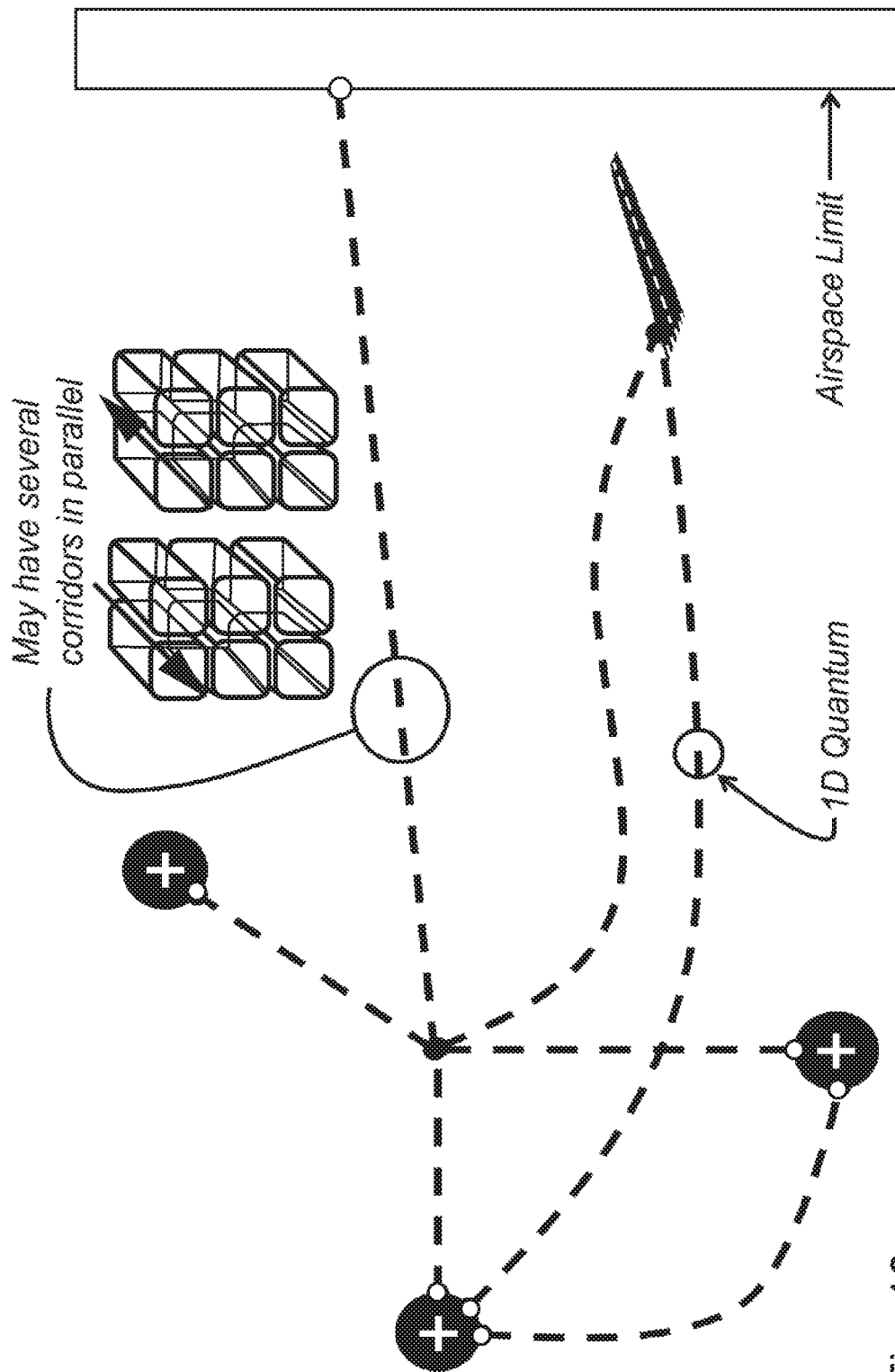
FIG. 13 shows notional depiction of the air traffic transport network and ID Quanta.

This example embodiment presents the application of the proposed method in a distributed automatic transport network management system. Such network could be a network of tunnels for underground transport, a network of conveyors in an industrial application, a rail network running on ground and underground levels or any other transport network. To illustrate the application of the method in this kind of problem, this example embodiment will focus on a network of air corridors that are part of an air transport system as shown in FIG. 13.

Different from the previous example for a Performance-based Free Flight Air Traffic Management, the transport network management in this example is comprised of several, previously defined corridors. Such a system could operate in tandem with ATM and air space procedures currently in place worldwide as well as with the ATM proposed in the previous example.

The elements of such a system are presented and should provide a clear understanding of the suitability of the proposed method for this application.

Participants for this simplified example are: airspace users (flying vehicles) 102, fleet operators, airspace authority 104, municipality authority 106, landowners 108, emergency services 110, weather information providers 112 and air traffic surveillance providers.

The Quanta in this example comprises several volumes of airspace arranged in line connecting points in space, ultimately forming a graph with multiple branches. These points could be a landing/take-off pad, a runway, a point that interfaces with other airspaces or a point in space where several routes converge to redirect flights to other corridors. The location in space and size of these airspace volumes would be defined when creating the corridors, and could be changed/adjusted anytime if necessary. Still concerning the Quanta, time is a parameter for interacting with Quantum, not a dimension that defines a Quantum. In this example embodiment, it is considered that Quanta will be represented by Smart Contracts in a distributed ledger.

The corridors forming the network may have their sizes and locations in space based on common procedures to be followed by all vehicles 102 flying in that airspace. However, a performance-based approach is also a possibility for the network, where specific corridors would be accessible only to users that comply, as an example, with minimum requirements for noise, navigation precision, speed, reliability or ability to execute specific safety contingencies in case of failure.

Figure 7:
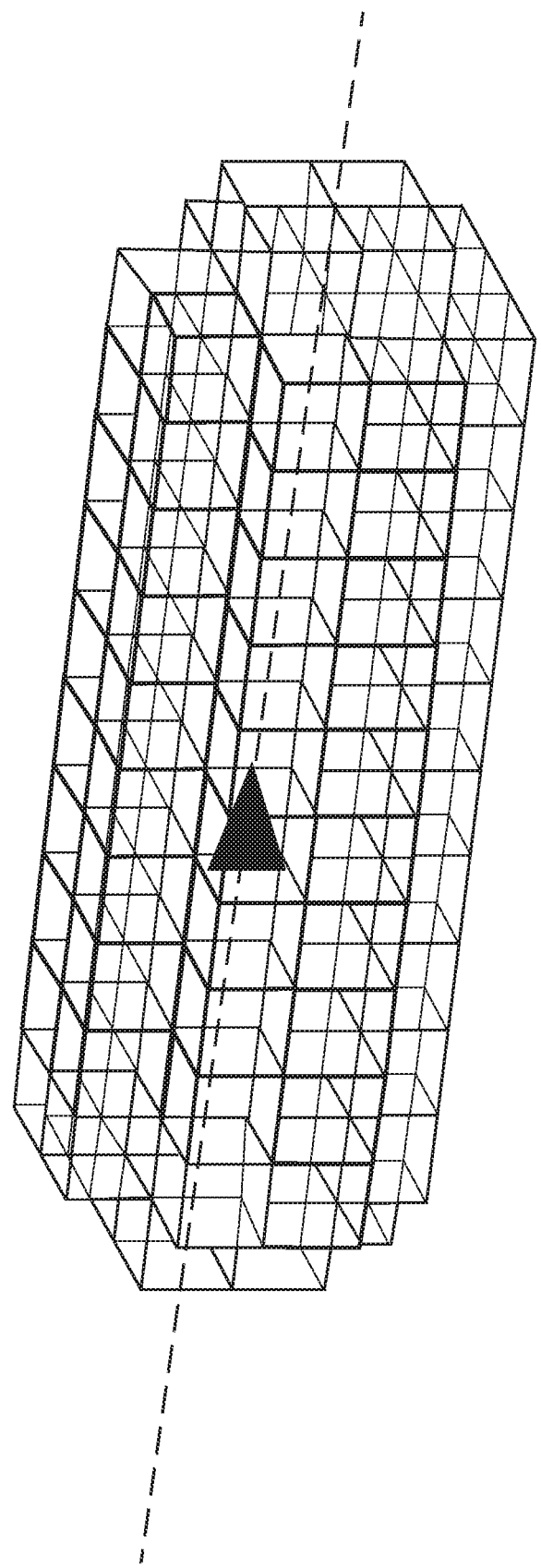
FIG. 7 shows a notional 3D depiction of reserved Quanta along a trajectory.

Each flight within the network shall have a valid flight plan before its start. The flight plan defines a number of Quanta to be reserved at different times along the routes as the flight progresses. See FIG. 7 as an example of a notional 3D depiction of reserved Quanta along a flight plan trajectory. If a flight plan is valid, then there is no conflict with other flights from the start to the end of the route and the flight plan complies with all required performance for that route.

Vehicles continuously update their position along the route. The role of weather information providers 112 and air traffic surveillance providers would be the same as in the previous Air Traffic Management example. However, given the more restrictive nature of the transport network, both traffic and weather information could focus only on areas actively used by vehicles 102.

A possible common arrangement would be a cluster of adjacent corridors that could dynamically change flight direction and even location in space, if necessary. Corridors' size and location in space take into consideration not only clearance for safety reasons but also other aspects that may affect communities such as noise, privacy, visual impact, air quality (in case of non-zero emissions vehicles) and others. Additionally, adequate separation between vehicles along the same corridor as well as flight direction and separation among vehicles in adjacent/near corridors shall be defined to ensure that all vehicles in that area have enough clearance to perform safety procedures in case of failure and avoid collision in case of any non-cooperative threats.

The Quanta as defined in this example allow any participant to have the same kind of interaction with the distributed system as presented in the previous example. However, again, given the simplified nature of the transport network using corridors, it is probable that many aspects of interest for participants would be defined at the moment the corridors are created. For example, municipalities 106 and affected landowners 108 would participate of the definition of the corridors, their allowed changes in space and their criteria to operate. Therefore, there may be no need to assess and approve each flight plan with respect to privacy and noise.

Example: Road Traffic Prediction and Management

This example embodiment presents the application of the method for conceiving a distributed automatic road traffic prediction and management system. The elements of such system are presented and should provide a clear understanding of the suitability of the proposed method for this type of road traffic prediction and management problem.

Participants for this simplified example are: users 102 (cars, trucks, trams, motorcycles, bicycles, etc., manned or autonomous), transit authority 104, municipality authority 106, fleet operators, emergency services 110 and weather information providers 112.

The purpose of this system is to predict how traffic will evolve in the immediate future, seconds, minutes or hours ahead depending on the scenarios involved, enabling a myriad of applications that optimize the utilization of the ground infrastructure, optimize the use of vehicles and ultimately prevent the formation of traffic jams and improve the daily lives of users.

Greatly improving predictions for near future traffic not only improves time estimates for trips but also creates the opportunity to take actions to avoid the creation of traffic jams. Current systems already monitor traffic with ground sensors and mobile apps running in the background of passengers' phones. Those systems predict traffic based on recurrent patterns at a given time and day of the week or year. However, in spite of this prediction based on historic data, these systems are mainly reactive rather than proactive.

The distributed automatic road traffic prediction and management system proposed herein, however, provides a collaborative and secure platform to improve traffic predictions by accounting for actual vehicle driving plans. Current navigation services could make use of the same kind of information to improve predictions but would be limited to the routes navigated using only that specific navigation service (e.g., Google Maps, Maps from Apple, etc.) or vehicles that are part of a single operator fleet (e.g. Uber, Lyft, etc.).

The system as proposed in this embodiment would share future traffic information regardless of the user, navigation service or operator. While benefits appear even with only part of vehicles disclosing their intended routes, it is expected that the more vehicles share their routes, the more precise and longer term the future traffic forecast can be. This becomes even more relevant as several independent autonomous car fleets start operating in the near future. To enable this sharing of routes among several fleet operators, as well as individual users, it is possible to establish a platform that allows fill collaboration while guaranteeing that business sensitive data as well as personal private data will be secure.

Several features work in tandem to prevent the formation of traffic jams. At the start of a ride, a better prediction of the future state of the roads to be traveled, at the time the vehicle will be there, contribute to choose the real optimal route. While driving, constant route updates allow for early prediction of traffic jams yet to be formed, giving the opportunity for many vehicles still far from the jam formation to change their routes earlier. Additionally, the same network that collects the data also is able to provide directions for vehicles and infrastructure in a specific way so users can move to a side lane, stop, slow down or even accelerate to clear the way for priority traffic (e.g., first responders). The same network also supports real-time, wireless calibration for traffic lights and other infrastructure to allow real-time traffic flow optimization and traffic jams prevention.

Concerning the Quanta, a defined street or avenue is represented by an edge in a graph and divided in a number of smaller segments along its length. See FIG. 2(c). Each of these small segments defines a Quantum, and time is a parameter for interacting with Quantum and Participants, not a dimension that defines Quanta. Different from the Air Traffic Management and Transport Networks non-limiting embodiments presented in the previous sections, instead of reserving the Quanta along the way, a new trip just updates the Quanta along the way with the probability of that vehicle to be in each Quantum at a specific time. This probability is added to all other vehicles' probabilities at a specific time for each Quantum, ultimately predicting the level of traffic at all times. In this stochastic approach, other data besides the probabilities for each participating vehicle, such as historic data and real time data from other sources, also is taken in account. Each Quantum has properties to determine the level of traffic in each specific Quantum at different times in a stochastic way.

The uncertainties of road traffic and not having 100% of vehicles sharing its routes favor the stochastic approach. Also favoring the scholastic approach is the fact that roads have multiple lanes, what allow several vehicles to be at the same time in the same ID Quanta. Having different Quanta for different lanes, and then reserving those Quanta for a single vehicle during a defined time period, similar to the non-limiting embodiments proposed ATM and Transport Networks, may be impractical in some implementations but practical in others such as autonomous vehicle control.

At the start of a trip, a vehicle shares its route with the network, updating the predicted status of the Quanta along the route for different times in the near future. As the vehicle progresses along the route, it continually updates that estimate. This way, at the time of the start of the ride, the Quantum at the end of the route already accounts for that traffic minutes if not hours ahead. The cumulative effect of having this data for several vehicles, on top of all other sensors and data feeds already available, culminates in a much more precise estimate and ability to prevent the formation of traffic jams.

Of course, traffic jams may be caused by several other factors besides a high number of cars in the same road at the same time. Other causes may be accidents, road work and irregular flow just to name a few. Nevertheless, the system of this example mitigates the worsening of the traffic jam by forecasting how quick it is going to grow and, therefore, providing earlier information for vehicles to go for an alternative. Also, active measures through road infrastructure and participating vehicles help dissipate any already formed traffic jam quicker.

Example: Energy Management

This example embodiment presents the application of the method for a distributed automatic energy management system. The elements of such system are presented and should provide a clear understanding of the suitability of the proposed method for this type of problem.

Participants for this example are: energy producers (distributed residential power generation, large power plants, small local power plants, power storage facilities, local storage, etc.), energy distributors, energy transformers, energy authority, municipality authority and energy consumers.

A purpose of this system is to create a way for energy producers, distributors and consumers to interact in a safe and secure way among each other within the main energy grid, a micro-grid (that may connect to larger energy grids) or, preferably, a myriad of micro-grids forming a larger network. Examples of local energy generation technologies are solar panels, small wind turbines, small hydroelectric and small methane gas turbines, just to name a few. There are also a myriad of power storage technologies; examples could be chemical such as lithium, zinc, saltwater; mechanical such as flywheels, pumped water, compressed air, gravitational potential energy; and thermal such as heated molten salt and heated water.

In a world with distributed, ubiquitous local energy generation and storage, the coordination among all participants in the grid is essential to maximize overall system efficiency, reliability and resilience. Eventually, this distributed arrangement would also provide features to allow an open, distributed energy marketplace, allowing instant energy trading and delivery, as well as longer-term energy contracts.

Different types of Quanta exist in this system. For example, a first type would represent the branches of the energy distribution network in a given region. Any transmission line connecting two or more participants is represented by a Quantum of this type. This energy distribution network comprises distribution lines owned by multiple parties, companies and individuals. In other words, instead of a single utilities company performing the energy distribution, this type of Quanta allows multiple, independent distribution lines owned by different entities to participate in the energy distribution. This type of Quanta is non-dimensional, forming a graph that represents the energy distribution lines that connect participants in a given grid. Each branch in this graph, represented by a non-dimensional Quantum, would reflect in its properties the characteristics of the transmitted energy. See FIG. 2(b). Such characteristics could be fixed such as AC, DC, Frequency, Frequency Range (for variable frequency) and Voltage as well as dynamic such as instant frequency, real power, reactive power, power factor, used load, available permanent load, available short load, available peak load, energy quality aspects, etc. The properties reflect current (real-time) and foreseeable states of that particular distribution line along time, defining an ability to accommodate more or less energy transmission at different times and ensuring safe and efficient operation (example: consider failure modes, avoid failure propagation to other participants, ensure energy quality, minimize thermal losses, etc.).

A second type of Quanta would represent energy producers and consumers. When implemented in a permission-less network, any energy producer is able to join the network and make its energy available. In many cases, the same participant could be a producer or a consumer depending on its energy balance. Additionally, this second type of Quanta could represent a new type of participant, that does not produce nor consume energy but transforms it from one form to another. This provides a way to connect transmission lines that transport energy in different forms or to connect producers and consumers that use energy in different forms (example: AC, DC, Variable Frequency, High Voltage, Low Voltage, etc.).

This second type of Quanta would be able to define an interface to one or more Quanta of the first type, reflecting a physical connection between a producer/consumer to a distribution line. Such connections respect the characteristics of the transmitted energy. Nevertheless, a producer/consumer is able to connect to a transformer or has the ability to provide/use energy in more than a single form.

This energy distribution system can make use of any connectivity means that happens to be available. However, communication between all participants can, eventually, also be achieved transmitting information through the power lines itself in a way that the system would still operates even if all other connectivity means are no longer available.

Besides improving overall system efficiency, reliability and resilience for local energy generation and distribution, the system also allows storage systems within a given region to work as a utility scale no-break, providing uninterrupted power even if no power generation is available.

An alternative implementation of this system considers that a single entity provides and controls the distribution system, in a way that other control means are put in place by this single entity to ensure all lines in the network are operating within designed levels. In this scenario, some of the previously described benefits would not be achieved. However, this alternative would keep the current arrangement used by large utility companies that operate under a public concession. Eventually, such arrangements will facilitate the introduction of this kind of distributed energy management system and the introduction of local generation in the current utility grids.

Example: Public Network of Sensors

An open, public, distributed permission-less network is possible where anyone can share data from sensors owned by anyone and located anywhere. This can be a 3 dimensional Quanta embodiment where different Quanta are defined for different physical quantities based on a 3 dimensional space. In this way, we have different Quanta for

Example: Local Electromagnetic Spectrum Allocation

An embodiment with multidimensional Quanta can be the local electromagnetic spectrum allocation. In this embodiment, the Quanta are defined based in the 3 spatial dimensions plus different dimensions for different frequency bands, mimicking the regulation in place. Properties in the Quanta, or even additional types of Quanta, also account for polarization, modulation and other characteristics that may influence interoperability among systems working in the same frequency band.

This kind of approach allows the use of the electromagnetic spectrum in a more local and targeted way, reserving the space and frequency bands that are needed for a given application only during operation time. Eventually, different users that otherwise face interference can share the spectrum in different times or coordinate the use of alternate polarization or modulation to allow for simultaneous operation.

Example: Orbital Tracking and Traffic Management

This embodiment proposes a distributed automatic tracking and traffic management system for orbital spacecraft that is similar to the ATM embodiment discussed previously. In this case, instead of Cartesian volumes inside a small airspace, the Quanta can be formed by volumes in a spherical coordinate system for the space around the Earth, encompassing all different orbits around Earth (LEO—Low Earth Orbit, MEO—Medium Earth Orbit, GEO—Geo-stationary Earth Orbit and HEO—Highly Elliptical Orbit). The purpose is to manage the various objects orbiting the earth, such as satellites, spacecraft, space junk, and even reserve space for energy or information to be transmitted straight to Earth in form of laser, microwave or any other line-of-sight method.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A distributed automatic quanta based space sharing system comprising:
   a first processor associated with a first object, the first processor connected to a first communications interface and configured to execute first code stored in a first memory to perform a first quanta based space reservation process for the first object using smart contracts of one or more first quanta, the first object being configured to move through a defined space, the quanta being defined in the defined space by quantizing the defined space into discrete elements, and implemented using distributed ledger technologies providing the smart contracts; and
   a second processor connected to a second communications interface and configured to execute second code stored in a second memory to perform a second quanta based space reservation process using the smart contracts of one or more second quanta;
   wherein the first and second processors are further configured to use the first and second communication interfaces to communicate space reservation request and denial messages between the first and second quanta based space reservation processes to negotiate a succession of said discrete elements comprising a reserved path for the first object to move through using the respective smart contracts.

2. The system of claim 1 wherein the quanta reserved by the first processor are the same quanta reserved by the second processor.

3. The system of claim 1 wherein the first and second processors authenticate one another using digital signatures.

4. The system of claim 1 wherein the quanta represent locations of air space elements in 3-dimensional air space.

5. The system of claim 1 wherein the quanta are represented by locations of segments on a graph.

6. The system of claim 1 wherein the quanta includes time parameters and the first and second processors reserve the quanta based on both position and time.

7. The system of claim 1 wherein the quanta includes time sequences of N-dimensional spatial representations.

8. The system of claim 1 wherein the first and second processors are further configured to execute code that manipulates:
   current status and/or state of the quanta,
   identification of the quanta,
   expiration of the quanta,
   parameters relating to performance of the first object,
   authority,
   real time data, and
   services provided to participants other than the first object.

9. The system of claim 1 wherein the quanta define rights and duties.

10. The system of claim 1 wherein the first and second processors provide automatic space management by controlling/managing the quanta through predefined properties, and autonomously interact directly with one another without the need of an intermediary or approver.

11. The system of claim 1 wherein the first and second processors autonomously, cooperatively interact together based on predefined respective rights to together control utilization of the space.

12. The system of claim 1 wherein the first object comprises a first aircraft and the second processor is associated with a second aircraft.

13. The system of claim 1 wherein the first object comprises an aircraft and the second processor is associated with a ground structure.

14. The system of claim 1 wherein the first processor is further configured to reserve Quanta based on a performance-based approach that maximizes space utilization that provides a better equipped, better performance vehicle comprising the first object with optimized trajectories and reduced separations, and reserves larger space volumes for a less equipped, reduced performance vehicle comprising the first object.

* * * * *